US008734729B2

(12) United States Patent
Chun et al.

(10) Patent No.: US 8,734,729 B2
(45) Date of Patent: May 27, 2014

(54) STABILIZED CERAMIC COMPOSITION, APPARATUS AND METHODS OF USING THE SAME

(71) Applicants: ChangMin Chun, Annandale, NJ (US); Frank Hershkowitz, Basking Ridge, NJ (US)

(72) Inventors: ChangMin Chun, Annandale, NJ (US); Frank Hershkowitz, Basking Ridge, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 18 days.

(21) Appl. No.: 13/769,620

(22) Filed: Feb. 18, 2013

(65) Prior Publication Data
US 2013/0231238 A1 Sep. 5, 2013

Related U.S. Application Data

(62) Division of application No. 12/467,752, filed on May 18, 2009, now Pat. No. 8,399,372.

(51) Int. Cl.
*B01J 19/00* (2006.01)
*C04B 35/482* (2006.01)

(52) U.S. Cl.
USPC ........... 422/240; 422/198; 422/206; 422/310; 501/103; 501/104; 585/920

(58) Field of Classification Search
USPC .......... 422/198, 206, 240, 310; 501/103, 104; 585/920
See application file for complete search history.

(56) References Cited

U.S. PATENT DOCUMENTS

| 1,064,447 A | 6/1913 | Cross |
| 1,723,679 A | 8/1929 | Coberly et al. |
| 1,843,965 A | 2/1932 | Wulff |

(Continued)

FOREIGN PATENT DOCUMENTS

| BE | 491 423 | 10/1949 |
| CA | 306 263 | 12/1930 |

(Continued)

OTHER PUBLICATIONS

Bartholome, V.E., "*Methods of Energy Addition for Endothermic Gas Reactions at High Temperatures*", Zeitschrift fuer Elektrochemie und Angewandte Physikalische Chemie, 57, pp. 497-502 (1953).

(Continued)

*Primary Examiner* — Lessanework Seifu

(57) ABSTRACT

In one aspect, the invention includes a refractory material, said material comprising: (i) at least 20 wt. % of a first grain mode stabilized zirconia based upon the total weight of said material, said first grain mode having a D50 grain size in the range of from 5 to 2000 μm, said stabilized zirconia including a matrix oxide stabilizer; (ii) at least 1 wt. % of a second grain mode having a D50 grain size in the range of from 0.01 μm up to not greater than one-fourth the D50 grain size of said first grain mode zirconia, based upon the total weight of said material; and (iii) at least 1 wt. % of a preservative component within at least one of said first grain mode stabilized zirconia, said second grain mode stabilized zirconia, and an optional another grain mode; wherein after sintering, said material has porosity at 20° C. in the range of from 5 to 45 vol %.

24 Claims, 2 Drawing Sheets

(56) References Cited

U.S. PATENT DOCUMENTS

| | | |
|---|---|---|
| 1,880,306 A | 10/1932 | Wulff |
| 1,880,307 A | 10/1932 | Wulff |
| 1,880,308 A | 10/1932 | Wulff |
| 1,880,309 A | 10/1932 | Wulff |
| 1,880,310 A | 10/1932 | Wulff |
| 1,917,627 A | 7/1933 | Wulff |
| 1,938,991 A | 12/1933 | Wulff |
| 1,966,185 A | 7/1934 | Preisman |
| 1,966,779 A | 7/1934 | Wulff |
| 1,996,185 A | 4/1935 | Wulff |
| 2,037,056 A | 4/1936 | Wulff |
| 2,319,579 A | 8/1939 | Black |
| 2,236,534 A | 4/1941 | Hasche |
| 2,236,555 A | 4/1941 | Wulff |
| 2,319,679 A | 4/1942 | Hasche et al. |
| 2,343,866 A | 3/1944 | Hincke |
| 2,558,861 A | 7/1951 | Liggett |
| 2,580,766 A | 1/1952 | Hall |
| 2,608,594 A | 8/1952 | Robinson |
| 2,645,673 A | 7/1953 | Hasche |
| 2,678,339 A | 5/1954 | Harris |
| 2,692,819 A | 10/1954 | Hasche et al. |
| 2,706,210 A | 4/1955 | Harris |
| 2,718,534 A | 9/1955 | Harris |
| 2,790,838 A | 4/1957 | Schrader |
| 2,796,951 A | 6/1957 | Bogart |
| 2,813,919 A | 11/1957 | Pearce |
| 2,830,677 A | 4/1958 | Coberly |
| 2,845,335 A | 7/1958 | Hasche |
| 2,851,340 A | 9/1958 | Coberly et al. |
| 2,885,455 A | 5/1959 | Hennig |
| 2,886,615 A | 5/1959 | Lindahl |
| 2,920,123 A | 1/1960 | Oldershaw et al. |
| 2,921,100 A | 1/1960 | Pettyjohn et al. |
| 2,956,864 A | 10/1960 | Coberly |
| 2,967,205 A | 1/1961 | Coberly |
| 3,024,094 A | 3/1962 | Coberly |
| 3,093,697 A | 6/1963 | Kasbohm et al. |
| 3,156,733 A | 11/1964 | Happel et al. |
| 3,156,734 A | 11/1964 | Happel |
| 3,175,919 A | 3/1965 | Smoot et al. |
| 3,555,685 A | 1/1971 | Loge |
| 3,796,768 A | 3/1974 | Starzenski et al. |
| 4,119,469 A | 10/1978 | Carbonnel et al. |
| 4,176,045 A | 11/1979 | Leftin et al. |
| 4,200,682 A | 4/1980 | Sederquist |
| 4,240,805 A | 12/1980 | Sederquist |
| 4,256,565 A | 3/1981 | Friedman et al. |
| 4,264,435 A | 4/1981 | Read, Jr. et al. |
| 4,461,843 A | 7/1984 | McGarry et al. |
| 4,536,603 A | 8/1985 | Sprouse et al. |
| 4,754,095 A | 6/1988 | Coughenour et al. |
| 4,929,789 A | 5/1990 | Gupta et al. |
| 4,973,777 A | 11/1990 | Alagy et al. |
| 5,068,486 A | 11/1991 | Han et al. |
| 5,138,113 A | 8/1992 | Juguin et al. |
| 5,723,393 A | 3/1998 | Majumdar et al. |
| 5,886,056 A | 3/1999 | Hershkowitz et al. |
| 5,935,489 A | 8/1999 | Hershkowitz et al. |
| 5,976,352 A | 11/1999 | Busson et al. |
| 6,027,635 A | 2/2000 | Busson et al. |
| 6,076,487 A | 6/2000 | Wulff et al. |
| 6,228,293 B1 | 5/2001 | Kriegsmann et al. |
| 6,287,351 B1 | 9/2001 | Wulff et al. |
| 6,322,760 B1 | 11/2001 | Busson et al. |
| 6,365,792 B1 | 4/2002 | Stapf et al. |
| 6,575,147 B2 | 6/2003 | Wulff et al. |
| 6,632,351 B1 | 10/2003 | Ngan et al. |
| 7,815,873 B2 | 10/2010 | Sankaranarayanan et al. |
| 7,846,401 B2 | 12/2010 | Hershkowitz et al. |
| 2002/0020113 A1 | 2/2002 | Kennedy et al. |
| 2007/0191664 A1 | 8/2007 | Hershkowitz et al. |
| 2008/0274871 A1* | 11/2008 | Hoshino et al. ............ 501/104 |
| 2008/0300438 A1 | 12/2008 | Keusenkothen et al. |
| 2009/0008292 A1 | 1/2009 | Keusenkothen et al. |
| 2009/0250377 A1 | 10/2009 | Chun et al. |
| 2010/0126907 A1 | 5/2010 | Chun et al. |
| 2010/0130803 A1 | 5/2010 | Keusenkothen et al. |
| 2010/0288617 A1 | 11/2010 | Hershkowitz et al. |
| 2010/0290978 A1 | 11/2010 | Chun et al. |
| 2010/0292523 A1 | 11/2010 | Hershkowitz et al. |
| 2011/0011768 A1 | 1/2011 | Keusenkothen |

FOREIGN PATENT DOCUMENTS

| | | |
|---|---|---|
| EP | 1 386 665 | 2/2004 |
| FR | 841 410 | 2/1939 |
| FR | 1 588 738 | 4/1970 |
| GB | 763675 | 12/1956 |
| GB | 830 574 | 3/1960 |
| GB | 855 764 | 12/1960 |
| GB | 972153 | 10/1964 |
| GB | 1064447 | 4/1967 |
| GB | 1149798 | 4/1969 |
| GB | 959818 | 6/1994 |
| RU | 2 249 570 | 4/2005 |
| WO | WO 01/70913 | 9/2001 |
| WO | WO 2007/075945 | 7/2007 |

OTHER PUBLICATIONS

Basu, B. et al., "*Microstructure-toughness-wear relationship of tetragonal zirconia ceramics*", Journal of the European Ceramic Society, Elsevier Ltd., vol. 24, pp. 2031-2040 (2004).

Bixler, G.H. et al. "*Wulff Process Acetylene*", Journal of Industrial and Engineering Chemistry, Washington, D.C., 45, pp. 2596-2606 (1953).

Bogart, M.J.P. et al., "*Recent Developments in Wulff Acetylene*", Chemical Engineering Progress, 50, pp. 372-375 (1954).

Bogart, M.J.P. et al., "*The Wulff Process for Acetylene from Hydrocarbons*", Petroleum Processing, 8, pp. 377-382 (1953).

Garifzyanova, G.G. et al., "*Pyrolysis of Vacuum Resid by the Plasma Chemical Method*," Chemistry and Technology of Fuels and Oils, vol. 42, No. 3, pp. 172-175 (2006).

Holmen, A. et al., "*Pyrolysis of natural gas: chemistry and process concepts*", Fuel Processing Technology, 42, Elsevier Science B.V., pp. 249-267 (1995).

Jennings, R.J.S., "*Organic Chemicals from Natural Gas-I*", Chemical & Process Engineering, 33, pp. 243-246 (1952).

Kinney, C.R. et al. "*On the Mechanism of Carbonization of Benzene, Acetylene and Diacetylene at 1200° C.*", Proc. $4^{th}$ Carbon Conference, Pergamon Press, pp. 301-313 (1960).

Lee, S.Y. "*Sintering behavior and mechanical properties of injection-molded zirconia powder*", Ceramics International, Elsevier Ltd., vol. 30, Issue 4, pp. 579-584 (2004). Abstract retrieved from the Internet:< URL: http://www.sciencedirect.com/science> on May 1, 2008.

Moskovits, M. et al, "*Sintering of bimodal Y2O3-stabilized zirconia powder mixtures with a nanocrystalline component*", Nanostructured Materials, Elsevier Science Ltd., vol. 11, Issue 2, pp. 179-185 (1999). Retrieved from the Internet: <http://www.sciencedirect.com/science> on Jul. 23, 2008.

Nait-Ali, B. et al., "*Thermal conductivity of highly porous zirconia*" Journal of the European Ceramic Society, Elsevier Ltd., vol. 26, Issue 16, pp. 3567-3574 (2006). Retrieved from the Internet:<URL:http://www.sciencedirect.com/science> on May 1, 2008.

Ries, H.C., "*Acetylene*", Process Economics Program, Stanford Research Institute, Report No. 16, Menlo Park, CA, Sep. 1966, pp. 1-403.

China and the Japanese Petrochemical Industry, Chemical Economy and Engineering Review, Jul./Aug. 1985, vol. 17, No. 7.8 (No. 190), pp. 47-48.

Ovid'Ko, I.A. et al., "*Plastic Deformation and Fracture Processes in Metallic and Ceramic Nanomaterials with Bimodal Structures*", Rev. Adv. Mater. Sci. vol. 16 pp. 1-9 (2007).

Pertti Auerkari, Mechanical and Physical Properties of Engineering Alumina Ceramics, Technical Research Centre of Finland, 1996, pp. 1-26.

(56) References Cited

OTHER PUBLICATIONS

Sherwood, V.P.W. et al., "*Acetylene from Natural Gas and Petroleum*", Erdoel und Kohle 7, pp. 819-822 (1954).

Sneddon, R., "*Successful Acetylene Synthesis*", The Petroleum Engineer, 26, pp. C5-C8 (1954).

Weaver, T. "*Economics of Acetylene by Wulff Process*", Processing Engineering, Chemical Chemical Engineering Progress. 49, pp. 35-39 (1953).

Vaβen, R. et al., "*Toughening of sic ceramics by a bimodal grain size distribution produced by hiding ultrafine and coarse grained SiC powers*", Nanostructured Materials, Elsevier, vol. 6, No. 5, pp. 889-892(4) (1995). Retrieved from the Internet:<URL:http://www.ingentaconnect.com> on May 1, 2008.

Wen-Cheng J. Wei et al, "Mechanical and Thermal Shock Properties of Size Graded Mg0-PSZ Refactory," Journal of the European Ceramic Society, vol. 20, Jan. 1, 2000, pp. 1159-1167.

Wen-Cheng J. Wei, "Processing Character of Mg0-PSZ in Size Grading Prepared by Injection Molding," Journal of the European Ceramic Society, vol. 18, Jan. 1, 1998, pp. 2107-2116.

Zender H. H. et al, "Zr02 Materials for Application in the Ceramics Industry = Zr02-Werkstoffe für die Anwendung in der keramischen Industrie," Interceram, Schmid, Freiburg, DE, vol. 39, No. 6, Jan. 1, 1990, pp. 33-36.

\* cited by examiner

STABILIZED CERAMIC COMPOSITION, APPARATUS AND METHODS OF USING THE SAME

CROSS REFERENCE TO RELATED APPLICATIONS

This application is a divisional of U.S. application Ser. No. 12/467,752 filed on May 18, 2009, now allowed, and entitled "Stabilized Ceramic Composition, Apparatus and Methods of Using the Same".

FIELD OF THE INVENTION

This invention pertains to ceramic materials, components, methods, thermal reactor apparatus and processes using the same, demonstrating improved physical and chemical stability in refractory applications. In some embodiments, the components may have particular utility in pyrolysis reactors such as may be used for thermally cracking, converting hydrocarbons, or for performing other high temperature chemistry. The invention includes refractory grade ceramic components that are resistive to progressive compositional degradation, thereby demonstrating improved retention of certain performance properties, such as strength, toughness, chemical stability, and thermal stability at high temperatures such as above 1500° C., as compared to prior art refractory grade ceramics.

BACKGROUND OF THE INVENTION

Economical operation of high severity hydrocarbon cracking processes and equipment requires overcoming numerous competing operational and engineering challenges. The high temperatures and process stresses can exceed the long term viability of most conventional materials, including ceramics. In addition to component physical and thermal performance considerations, component chemical inertness and crystalline stability also become significant impediments requiring consideration. Component degradation and corrosion during long-term use present still further obstacles requiring address, particularly with regard to severe hydrocarbon processing.

One problem in the art pertains to ceramic stabilizer volatility and progressive loss of such stabilizer from the ceramic due to the severe pyrolysis temperatures and cyclic temperature swings. This stabilizer loss results in progressive reduction in crystalline stability and component degradation, eventually leading to premature component failure.

Conventional steam crackers are a common tool for cracking volatile hydrocarbons, such as ethane, propane, naphtha, and gas oil. Other higher severity thermal or pyrolysis reactors are also known to be useful for cracking hydrocarbons and/or executing thermal processes, including some processes that are performed at temperatures higher than can suitably be performed in conventional steam crackers. As compared to conventional cracking equipment and processes, higher temperature reactions and processes typically require more complex, costly, and specialized equipment to tolerate the intense heat and physical stress conditions. Properties such as temperature, reaction environment, component strength, and toughness limitations commonly defining upper limits for many of the processes and facilities.

In addition to processes utilizing high temperatures (e.g., >1500° C.), processes involving high temperatures plus large cyclic temperature swings and process fluid directional changes, such as regenerative or reverse flow reactor processes, pose even greater challenges. For example, the art discloses that to efficiently obtain relatively high yields of acetylene from pyrolyzing methane feed, such as in excess of 75 wt. % yield, reactor temperatures in excess of 1500° C. are required and preferably in excess of 1600° C., with relatively short contact times (generally <0.1 seconds). Due to the high temperatures involved, such processes are generally limited to relatively small amounts or batches using cyclical processes yielding a mixture of acetylene, CO, and $H_2$. Due to the high severity, such methane cracking processes, however, have been relatively inefficient, impractical, and of very limited commercial value as compared to other more economical processes for generation of acetylene. Acetylene is typically generated commercially by cracking feeds is other than methane, which may be done at lower temperatures.

The high temperature processes (e.g., >1500° C.) have previously not scaled well and are generally only useful for relatively high-cost, specialty applications. Processes such as thermally cracking methane to acetylene have largely been commercially unattractive due in large part to thermal, chemical, and mechanical degradation of the reactor equipment, including ceramic materials used therein. Cyclic temperature changes and product flow direction changes impose severe physical strength and toughness demands upon the refractory materials at high temperature. Such stresses and performance demands have also typically limited manufacturing and use of the refractory materials to relatively simple shapes and components, such as bricks, tiles, spheres, and similar simple monoliths. Reactor component functions and shapes have been limited for high severity services.

In addition to physical temperature limitations for reactor materials, many prior art ceramic reactor materials that are relatively inert at lower temperatures become susceptible to chemical degradation, ceramic corrosion, and/or crystalline alteration at higher temperatures, leading to premature equipment degradation and/or process interference, such as by generation of unacceptable levels of contaminants in the process. Although high temperature regenerative pyrolysis reactors are generally known in the art as capable of converting or cracking hydrocarbons, they have not achieved widespread commercial use, due significantly to the fact that they have not been successfully scaled to a commercially economical size or useful life span as compared to less severe alternatives, such as steam cracking.

The identified prior art pertaining to refractory materials for high-severity hydrocarbon pyrolysis dates primarily to the 1960's and earlier. However, that art merely occasionally provides generalized lists of some exemplary materials such as ceramics, alumina, silicon carbide, and zircon as reactor materials. These sparse, non-specific disclosures left the art largely incapable of providing a large-scale, commercially useful reactor or reactor process. The teachings of the art was only effective for enabling relatively small scale specialty applications that see vastly inferior use as compared to large scale processes such as hydrocarbon steam cracking. The identified art is void of teaching or providing a refractory ceramic material that is capable of sustaining the complex set of properties that are required for extended use in the reactive or other most-demanding regions of a high-severity (≥1500° C.) pyrolysis reactor, such as for the commercial production of acetylene and/or olefins from methane or other hydrocarbon feed. The studied art does not teach preferred crystalline structures or compositions for particular reactor furnace uses, or for complex reactor component shapes and/or functions. Multimodal ceramics are also is known in the ceramics art, as are ceramic compositions utilizing nanoparticles. However, the art remains void of teaching a ceramic or other composition or method of preparing the same that meets the rigorous performance properties needed for commercial application and long-term stability in high temperature cyclic pyrolysis processes. Further, the desired materials must maintain their formulations, crystalline structure, and corresponding physical and chemical properties for prolonged periods of time, at commercial scale and within the confines of an economic requirement. The studied art is believed to be similarly deficient at teaching materials suitable for complex, irregular, relatively fragile, or functionally-shaped reactor components.

For further example, the "Wulff" process represents one of the more preferred commercial processes for generation of acetylene. Wulff discloses a cyclic, regenerative furnace, preferably including stacks of Hasche tiles (see U.S. Pat. No. 2,319,679) as the heat exchange medium. However, such materials have demonstrated insufficient strength, toughness, and/or chemical inertness, and are not amenable to use as certain desirable reactor components, such as for use as reactor fluid conduits, to facilitate large-scale commercialization. Although some of the "Wulff" art disclose use of various refractory materials, a commercially useful process for methane cracking or other extreme high-temperature processes (e.g., >1500° C., >1600° C., and even >1700° C.) has not previously been achieved utilizing such materials. The aforementioned practical obstacles have impeded large scale implementation of the technologies. Materials availability for high temperature, high-stress applications is one of the most critical issues in design and operation of large-scale, commercial, high-productivity, thermal reactors. Due to high temperatures involved in cyclic pyrolysis reactors, generally only ceramic components have the potential to meet the materials characteristics needed in such aggressive applications.

One attempt to overcome the above listed problems involved use of a "deferred combustion" process that delayed combustion and heat generation until the reaction components were positioned into the core of the reactor, thermally isolated from flow control equipment that was subject to premature degradation. The deferred combustion, regenerative reactor process and equipment was disclosed in a U.S. patent application filed Dec. 21, 2006, Ser. No. 11/643,541, entitled "Methane Conversion to Higher Hydrocarbons," related primarily to methane feedstocks for pyrolysis systems. Although the disclosed process of the '541 application effectively controls the location of combustion within the reactor, the internal reactor components must still contend with the severely high temperatures, temperature changes, and physical stresses incurred during methane pyrolysis, is particularly for a commercially desirable reactor life term. The refractory material comprising the reactive regions may typically be a ceramic or related refractory material. In some embodiments, however, the disclosed processes and apparatus may utilize relatively complex shaped refractory components, such as a thin-walled honeycomb monolith used to conduct process fluids through the reactor. Such reactors and reactor component geometries may demand materials that have strength, toughness, chemical inertness, and other required properties that exceed the capabilities of previously identified or known refractory materials under such temperature and stress conditions.

Ceramics components generally can be categorized in three material categories: engineering grade, insulation grade, and refractory grade. The term "engineering grade" has been applied to ceramic materials which typically have very low porosity, high density, relatively high thermal conductivity, and comprise a complete component or a lining. Examples include dense forms of aluminum oxide ($Al_2O_3$), silicon nitride ($Si_3N_4$), silicon carbide (SiC), silicon aluminum oxynitride (SIALON), zirconium oxide ($ZrO_2$), transformation-toughened zirconia (TTZ), transformation-toughened alumina (TTA), and aluminum nitride (AlN). These materials usually possess high strength and toughness, which have been dramatically improved to the degree that ceramics are now available that can compete with metals in applications previously thought impossible for ceramics. Strength is a measurement of the resistance to formation of a crack or structural damage in the material when a load is applied. Toughness is a measurement of the resistance of the material to propagation of a crack or extension of damage to the point of failure. Even though engineering grade ceramics have superior strength and toughness at relatively low temperatures, they are relatively poor in thermal shock resistance (both strength and toughness) and many grades, such as but not limited to borides, carbides, and nitrides are not chemically stable at high temperature. Many are also not suitable for use at the high temperatures encountered with some pyrolysis reactions.

The second category of ceramic materials is insulation grade ceramics, which are typified by relatively high porosity. Many may have fibrous crystalline grain structures and are more porous than engineering grade ceramics, have lower density, and have lower thermal conductivity than engineering grade ceramics. Insulating monolithic ceramics and composite ceramics are often fabricated into various forms such as rigid boards, cylinders, papers, felts, textiles, blankets, and moldables. Many are primarily used for thermal insulation at elevated temperatures, such as up to 1700° C. A broad range of porosities and pore sizes can be produced, depending on the intended application, but in general, insulation is grade ceramics tend to be relatively porous as compared to engineering grade ceramics. Porous ceramics have many open or closed internal pores that provide the thermal barrier properties. Often, quite porous ceramics, such as those having porosity of greater than 50 vol. % and commonly even in excess of 90 vol. %, are used for thermal insulation where extremely low thermal conductivity (<0.08 W/m·K) is required. However, insulation grade ceramics typically lack the structural strength and functional toughness needed for the internal components of many pyrolysis reactors and processes. Insulation grade ceramics typically are recognized as having a flexural strength or toughness of less than about 4 Kpsi (27.6 MPa) and often of less than even 1 Kpsi (6.9 MPa). Also, the insulation properties of porous ceramics may tend to degrade as the pores may fill with coke accumulation.

The third generally recognized category of ceramic materials is refractory grade ceramics. Many refractory grade ceramics typically have porosity, strength, and toughness properties intermediate to such properties in engineering grade and insulation grade. Refractory grade ceramics typically have thermal shock resistance properties similar to some insulation grade ceramics but higher than engineering grade ceramics. Conversely, refractory grade ceramics typically lack the strength and toughness of engineering grades ceramics, but which properties exceed those of insulation grade ceramics. However, typically as strength increases, thermal shock resistance and related properties are compromised. All relevant properties must be considered when selecting a ceramic for a particular application.

As compared to insulation grade ceramics, refractory grade ceramics tend to be stronger across broader temperature ranges. Refractory grade ceramics also generally tend to be more resistant to thermal shock than engineering grade ceramics. However, while some ceramics tend to be somewhat inert or chemically stable at moderately elevated temperatures, many ceramics become chemically and/or structurally unstable at severely elevated temperatures, tending to degrade and corrode within undesirably short periods of time, rendering them unsuitable for some applications. Exemplary chemically and/or thermally unstable ceramics include certain silicas, aluminas, borides, carbides, and nitrides. Also, some refractory grade ceramics are known to possess lower thermal conductivities and coefficients of expansion than certain other refractory or engineering grade ceramics. Refractory grade ceramics are also known to undergo alterations in crystalline structure at elevated temperatures. Such alterations can result in changes in bulk volume which can result in creation of stress fractures and/or cleavage planes which can reduce the material's strength or performance properties.

Some advanced engineering ceramics, such as aluminas, zirconias, and silica, such as SiC and $Si_3N_4$, also provide superior strength, but their thermal shock resistance in grossly inadequate. Moreover, these silicon based ceramics can not be used at high temperatures (i.e. >1500° C.) due to high temperature oxidation issues. On the other end of the spectrum lie the insulation grade ceramics. These ceramics offer excellent thermal shock resistance, but they fall quite short of the required strength performance.

Zirconia is a crystalline material that is commonly used in certain ceramics, also having thermal application. However, zirconia undergoes a crystalline change at different temperatures in the way its atoms are stacked (polymorphic transformation). Zirconia has a monoclinic crystal structure between room temperature and about 1200° C. Above about 1200° C., zirconia converts to a tetragonal crystal structure. At a still higher temperature, such as above 2370° C., zirconia changes from tetragonal to cubic structure and melts at 2715° C. These transformations are accompanied by greater than one percent volumetric shrinkage during heating and equivalent expansion during cooling. The volumetric changes associated with alterations in crystalline structure can produce crystalline fractures or cleavages along grain boundaries. In polycrystalline zirconia, this tetragonal-monoclinic transition results in a reduction in strength and potential catastrophic failure of the component. Stabilizers, such as yttria and some metal oxides are can be into the crystal structure to arrest or prevent the crystalline shifts, rending the crystal structure across a more broad temperature spectrum.

However, it has recently been learned that extended exposure of stabilized ceramic components, such as but not limited to stabilized zirconias, to high temperature processes and severe environments can result in gradual evacuation or loss of the stabilizer component from the ceramic crystals. This loss undesirably results in progressing temperature-related re-alteration of the crystal structure over time, further leading to onset of the aforementioned cleaving and fracturing problems. Such stabilizer material loss and crystal alteration result in a corresponding degradation and reduction in life expectancy of the component, due to compromised performance properties.

The pyrolysis art needs a stabilized ceramic composition or material that provides the desirable set of performance properties and that can sustain those properties for a commercially meaningful period of use, by resisting loss of stabilizer, maintaining crystalline stability, and enduring prolonged exposure to high severity temperatures, substantial temperature swing cycles, cyclic flows of combustion and reaction materials. The desired materials must concurrently provide the needed structural integrity, crystalline stability, is relatively high heat transfer capability, and chemical inertness required for large scale, commercial, high productivity applications. Unavailability of such materials, components, and associated processes has been one of the most critical impediments against large scale, commercial adoption and application of many high temperature pyrolysis and chemistry processes and apparatus.

SUMMARY OF THE INVENTION

The present invention provides materials, compositions, components, reactors, processes, and methods that overcome the aforementioned deficiencies. Particularly, the present inventions include materials, components, and methods that among other attributes rectify the loss of stabilizer and corresponding crystalline instability problems. Inventive embodiments and aspects may have broad application to stabilizing ceramic materials for use in high temperature pyrolysis and/or highly active environments, resulting in extended component and equipment life expectancy and predictability. For example, the present inventions may have particular application for use in high temperature pyrolysis reactors and furnaces, and more particularly with such apparatus and processes involving high temperatures, aggressive environments, or other thermodynamically active reactions.

In one aspect, the invention includes but is not limited to ceramic components and pyrolysis reactors utilizing such components, including but not limited to manufacturing processes and uses related thereto. According to the present invention, the unique combination of stabilized zirconia, distribution of multiple grain sizes, stabilization of the grains, presence of a preservative component, and prescribed porosity is believed to provide inventive materials and components differing from anything previously known in pyrolysis and refractory arts.

In one aspect, the invention includes a refractory material comprising: (i) at least 20 wt. % of a first grain mode based upon the total weight of the refractory material, the first grain mode comprising stabilized zirconia, the first grain mode stabilized zirconia having a D50 grain size in the range of from 5 to 2000 µm (some embodiments in the range of from 5 to 800 µm), the stabilized zirconia including a matrix oxide stabilizer; (ii) at least 1 wt. % of a second grain mode having a D50 grain size in the range of from 0.01 µm up to not greater than one-fourth the D50 grain size of the first grain mode stabilized zirconia (the second grain mode is herein selected as the "fine" grit size mode, relative to the size of the larger or more "coarse" grit first grain mode), based upon the total weight of the refractory material; and (iii) at least 1 wt. % of a preservative component; wherein after sintering the material has porosity at 20° C. in the range of from 5 to 45 vol %. The preservative component may be is provided within one or more of (a) the first grain mode, (b) the second grain mode, and/or (c) an optional another grain mode, and the amount of the at least 1 wt. % of the preservative component is determined based upon the aggregate of preservative component within the refractory material. That is, the at least 1 wt. % minimum is not limited to a minimum amount in each mode, but instead to an aggregate amount within the entirety of the refractory material. The term "zirconia" is defined broadly to include not only zirconium oxide, as in many embodiments the crystals or grains comprising the refractory material are primarily made up on zirconium oxide crystals, but also the term zirconia as used herein also includes the element zirconium and other compounds including zirconium, as appropriate.

In many embodiments, the first or coarse grain mode stabilized zirconia is a partially stabilized zirconium oxide, a.k.a. herein as partially stabilized zirconia. The first grain mode zirconia stabilizer may include a matrix oxide stabilizer, such as a metal oxide. In many embodiments, the fine or second grain mode includes a stabilized zirconia. In many other embodiments, the second grain mode includes or even consists essentially of the preservative component. In some embodiments, the preservative component is provided primarily within the second grain mode. In still other embodiments, the preservative component is provided within the first grain mode, as a separate grain mode, or in a combination of both the first grain mode, second grain mode, and/or a distinct grain mode, including but not limited to embodiments where the another or distinct grain mode consists essentially of the preservative component. As used herein, the terms "grit," "particle" and "grain" generally may be used interchangeably, except as otherwise indicated.

In other embodiments, the second grain mode comprises a fully stabilized zirconia stabilized by a second grain mode zirconia stabilizer, wherein at least a portion of the second grain mode zirconia stabilizer also functions as the preservative component. In such embodiments, preferably the second grain zirconia stabilizer is present in an amount sufficient to at least partially stabilize and in some embodiments more preferably to fully stabilize, the second grain mode ceramic and also, surprisingly, with the remainder or excess amount of stabilizer in the second mode functioning as the preservative component to help the matrix oxide stabilizer to stabilize the first grain mode matrix without rendering the first grain matrix to be a fully stabilized. Sometimes, having a partially stabilized first grain mode may be preferable due to the superior physical and thermal performance properties offered by some of such embodiments. Therefore, it may be preferred sometimes to provide the preservative component primarily within the second grain mode, instead of within the first is grain mode, such that the first grain mode can remain substantially partially stabilized. In still other embodiments, however, the first grain mode may also be fully stabilized and still provide the desired physical and thermal performance properties.

Surprisingly, providing a fully stabilized zirconia within the material, such as for example within the second grain mode, has been found to provide a stabilizing function within the first grain mode for prolonged periods of exposure or use, particularly when the second grain mode stabilizer is present in an amount in excess of the amount required to merely fully stabilize the second grain mode. In some embodiments, the second grain mode zirconia stabilizer and second grain mode preservative component each comprise substantially the same materials or compounds as comprise the first grain matrix oxide stabilizer.

According to some embodiments, the second grain mode comprises a fully stabilized zirconia, the second grain fully stabilized zirconia stabilized by at least 14 wt. % of a second grain mode zirconia stabilizer based upon the weight of the second grain stabilized zirconia, wherein at least a portion of the second grain zirconia stabilizer within the fully stabilized second grain zirconia functions as the preservative component. In other of such embodiments, the second grain mode also further comprises a preservative component that also functions as the preservative component. Often, both excess mode stabilizer and preservative component comprise the same material and perform the same function of stabilizing the first grain mode of the refractory material so as to overcome the progressive loss of stabilizer therefrom due to the high temperature pyrolysis.

In still other embodiments, the second grain mode comprises at least 1 wt. % of preservative component, or for example at least 5 wt. %, 10 wt. %, 14 wt. %, 15 wt. %, 20 wt. %, 50 wt. %, 80 wt. %, 90 wt. %, or substantially 100 wt. % preservative component, based upon the weight of the second grain mode. The amount of preservative component is defined as that amount of stabilizer material present in the ceramic material or component that is in addition to the amount of such stabilizer material that is actively, initially engaged or employed in stabilizing the structure of the respective zirconia-containing mode or modes in which it is provided. For example, when a second grain mode stabilized zirconia is present, typically the second grain zirconia is a fully stabilized zirconia, stabilized by at least 14 wt. % of second grain matrix stabilizer. As only a fraction of the 14 wt. % is needed to at least partially stabilize the second grain mode stabilized zirconia, the extra amount of stabilizer is expendable for use or function as the preservative component without compromising the stability of the second grain mode crystal structure. It is not prohibitive or detrimental to practicing or making the invention that determining exactly how much of the fully stabilizing material or stabilizer is ambiguous or difficult to determine, so long as the total amount present in the second mode renders the second mode fully stabilized. It is sufficient to have learned that a fully stabilized second mode can offset the progressive loss of stabilizer from the first grain mode structure during prolonged use. The preservative component portion thus includes that portion of the stabilizer that is inn excess of the amount of stabilizer actually utilized in stabilizing the second grain zirconia matrix. It has been learned that surprisingly, a portion of the 14 wt. % minimum in a fully stabilized zirconia is useful to function as the preservative component. In many embodiments, the preservative component includes or is substantially the same compounds as comprise the first grain matrix oxide stabilizer such that the stabilizers are fully mutually compatible. (Weight percents are the amount of a component after initial sintering for at least ten minutes at a temperature of at least 1500° C., as appropriate, unless otherwise specified.)

In some embodiments, the second grain mode may comprise only a fraction by weight of fully stabilized zirconia or may not even comprise any stabilized zirconia at all, such that the second grain mode is comprised of at least 50 wt. % or substantially completely (at least 90 wt. %) or consists essentially of (at least 99 wt. % or even substantially 100 wt. %) the preservative oxide, based upon the weight of the second grain mode.

In still other embodiments, the inventive formed ceramic components include a flexural strength (modulus of rupture, MOR) of at least 6 kpsi and a normalized thermal shock resistance rating of at least four (4), as described herein. In other embodiments, the inventive formed ceramic components provide an MOR of at least 6 kpsi, while still other embodiments include MOR of at least 10 kpsi. The inventive components may also include a normalized thermal shock resistance rating of at least four (4) and preferably at least five (5).

In yet other aspects, the invention includes process for the manufacture of a hydrocarbon product from a hydrocarbon feed using a pyrolysis reactor, the process comprising the steps of: (a) providing a pyrolysis reactor with a reactive region comprising a refractory material that includes: (i) at least 20 wt. % of a first grain mode based upon the total weight of the refractory material, the first grain mode comprising stabilized zirconia having a D50 grain size in the range of from 5 to 800 μm, the stabilized zirconia including a matrix oxide stabilizer; (ii) at least 1 wt. % of a second grain mode having a D50 grain size in the range of from 0.01 μm up to not greater than one-fourth the D50 grain size of the first grain mode stabilized zirconia, based upon the total weight of the refractory material; and (iii) at least 1 wt. % of a preservative component within the aggregate of at least one of (a) the first grain mode, (b) the second grain mode, and (c) an optional another grain mode; wherein after sintering, the material has porosity at 20° C. in the range of from 5 to 45 vol %; (b) heating the reactive region to a temperature of at least 1500° C. to create a heated region; and (c) feeding a hydrocarbon feed into the heated region to pyrolyze the hydrocarbon feed and create a pyrolyzed hydrocarbon product.

DETAILED DESCRIPTION

Figure 1:
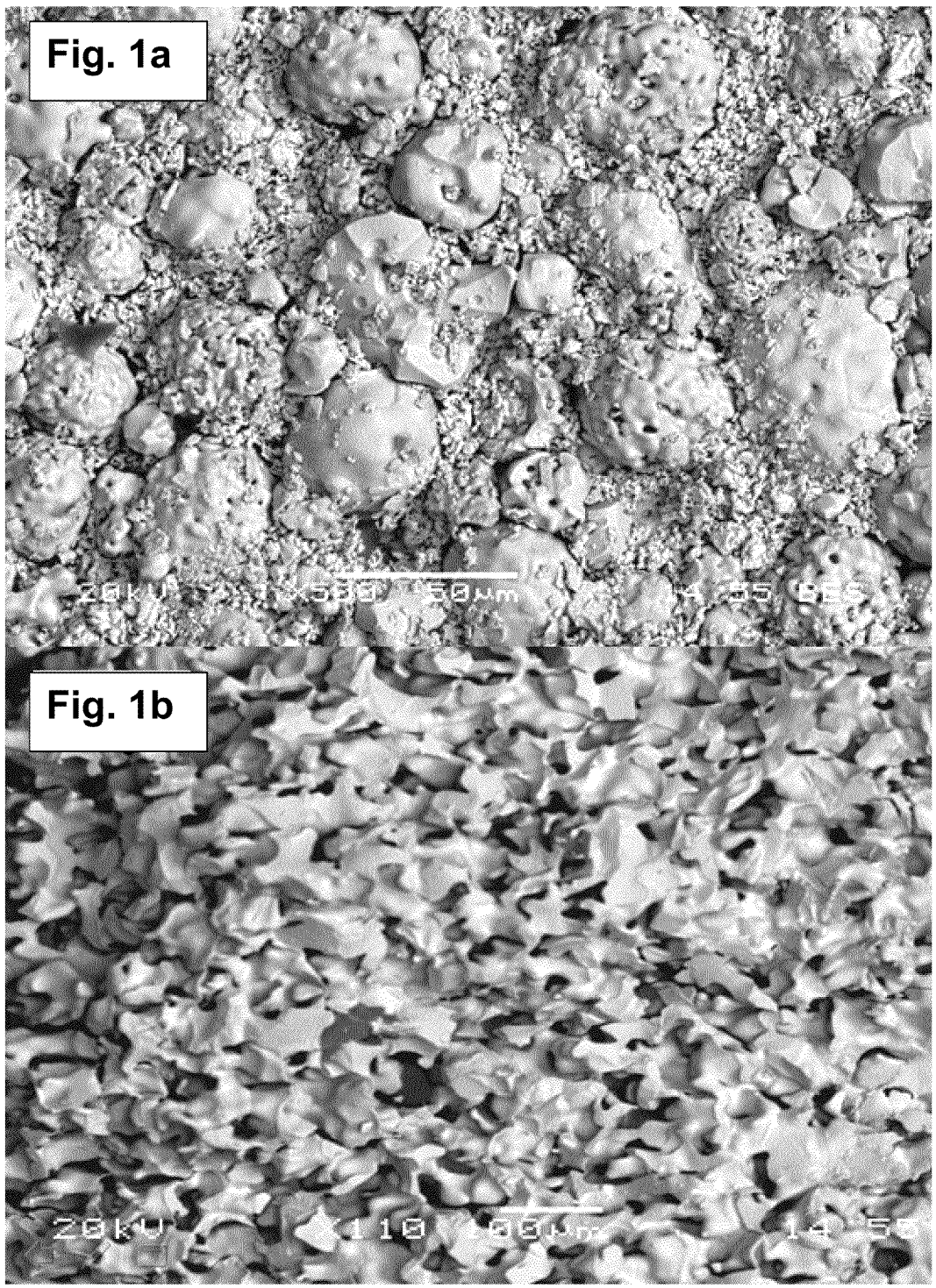
FIG. 1 illustrates an SEM photograph of an exemplary, sintered (FIG. 1a) and annealed (FIG. 1b), ceramic component according to one embodiment of the invention.

The present invention relates to advanced refractory type ceramics and uses for the same. In various aspects, the invention includes materials, components, apparatus, and processes having particular application for use with pyrolysis reactors for performing high temperature (e.g., >1500° C.) chemistry, conversions, cracking, and/or thermal alteration of feeds such as but not limited to hydrocarbon feeds. The inventive aspects include but are not limited to ceramic components and apparatus using the same that may have improved high temperature stability, prolonged life expectancy, and/or sustained performance properties that may exceed the life expectancy of one or more of such properties as compared to previously known ceramics.

The inventive aspects may have particular utility that facilitates enhanced large-scale commercialization of high temperature pyrolysis conversion processes. Exemplary suitable processes may include but are not limited to high-temperature pyrolysis reactor conversion of methane feed to acetylene or olefins, and coal gasification processes. Exemplary suitable apparatus may include but are not limited to pyrolysis reactors, reverse flow reactors, regenerative reactors, deferred combustion reactors, gasification reactors, syngas reactors, and steam cracking reactors and furnaces. Other exemplary inventive components may include but are not limited to reactor components and apparatus that feature engineered or otherwise particularly designed shapes, functions, configurations, intricacies, or irregular geometries that benefit from improved strength and shock resistance at high temperatures (e.g., >1500° C.). Such improvements may also lead to improved processes is related thereto.

In one aspect, the present invention provides a crystal or grain composition and structure resistive to progressive loss of stabilizer, thereby preserving the crystalline structural of certain multimodal, zirconia-based ceramic materials or components exposed to high temperature and/or highly reactive environments, so as to extend the useful service life of such components. Exemplary properties benefiting from the enhanced stabilization may include certain performance properties such as but not limited to flexural strength, normalized thermal shock resistance (MOR), and chemical stability at high temperature, as compared to such collective properties of previous art. Such improvements may in turn lead to prolonged component run-life, improved process and apparatus economics, and large-scale commercialization of processes and apparatus that were previously technically and/or economically disadvantaged due to unacceptable component life.

The present invention provides zirconia ceramic compositions that are resistive to stabilizer loss, can maintain crystalline stability, and can endure prolonged exposure to high temperatures, substantial temperature swing cycles, and cyclic flows of combustion and reaction materials. The present invention includes a ceramic composition having at least a two-component grain size distribution, such as but not limited to a multimodal (e.g., bimodal, trimodal, etc.) grain distribution. It also includes a prescribed porosity range to provide high strength, and preferably a minimum fracture toughness, and thermal shock resistance. The "two-component" grain distribution sizes and term "multimodal" are not intended to limit the invention or grain distribution only to a type of distribution curve exhibiting two or more distinct peaks, although such is within scope. The inventive distribution and term multimodal also includes a substantially single peak curve covering a size distribution within the claimed particle size ranges. In more simple terms, the inventive grain distribution includes a generally larger size first distribution of grains and generally smaller second distribution of grains, the first distribution being coarser in size than the second distribution, as further defined herein. The multiple-size grain distribution facilitates increased grain packing density, within the prescribed range of particle sizes, while facilitating the presence of porosity within a prescribed range.

The inventive materials also include a preservative component to offset, replace, and/or compensate for the progressive degradation problem, thereby maintaining crystallinity for an extended duration as compared to such compositions not including such preservative component. A relatively coarse, first grain mode provides a stabilized zirconia matrix, preferably a partially stabilized zirconia matrix, stabilized by a matrix oxide stabilizer. A is relatively fine, second grain mode mixed in with the first grain mode provides increased particle packing density, reinforcing the first grain matrix, and sometimes preferably provides the preservative component.

The inventive, improved structural and chemical stability and prolonged life is attributable at least in part to the presence of the preservative component within at least one of the modes of the multi-modal structure, preferably the second grit mode but alternatively in one or more of the larger grit mode or as a separate grit mode. In some embodiments, the preservative component may be present throughout all modes or as a distinct mode. The preservative component is preferably substantially evenly distributed throughout the modes in which it is present. The preservative component stabilizes the crystal structure across the broad spectrum of the relevant temperature range, as well as simultaneously contributing to the core physical properties of the ceramic. The improved performance characteristics may be also be attributable at least in part to one or more of various inventive material characteristics, such as but not limited to, the multimodal particle sizes and distribution, particle arrangement, particle material selection, degree of stabilization, manufacturing methods and techniques used, porosity, and combinations thereof.

The inventive materials may be provided, for example, in one or more regenerative reactor beds or cores that are useful for carrying out a high temperature chemical reaction. The inventive ceramic components also may be used in construction of one or more reactor embodiments, components, or regions of the reactor system, and may be of substantially any suitable geometry, form or shape, such as but not limited to spheres, beads, honeycomb materials, tubes, extruded monoliths, bricks, tiles, and other refractory components that are exposed to high temperature. The sustained strength and relative inertness properties of the inventive materials may provide for a wider range of component geometries and function than previously available in the art, again also leading to process improvements.

In one aspect, the inventive components and materials comprise zirconia ($ZrO_2$) based ceramics, particularly stabilized zirconia, and often partially and/or fully stabilized zirconia. Preferably, the zirconia material includes a diversity of grain sizes, such as, for example, in a multimodal grain configuration, comprising at least a first grain mode (e.g., a "coarse" mode, as compared to the second mode), with the first grain mode including a stabilized zirconia, preferably a partially stabilized zirconia. Preferably, the zirconia base ceramic also include a relatively smaller, second grain mode (a "fine" mode), which may or may not include a zirconia, but which in many preferred embodiments includes at least the is preservative component. In some alternative embodiments, the preservative component may be included within the coarse grain mode, as a distinct mode, or in combinations thereof. In addition to the first and second modes, other modes or additives may also be included within the material. According to the some preferred modes however, the second grain mode includes the preservative component, which may function to at least in part support or stabilize the crystal structure and constituent composition of the more coarse first grain mode. In many embodiments it may be preferred that the coarse grain mode zirconia is partially stabilized and not fully stabilized, to benefit from the enhanced mechanical properties afforded by partially stabilized zirconias. Adding the preservative component within the coarse or first grain mode may risk undesirably fully stabilizing the coarse grit mode. However, if such embodiment is acceptable for the intended application, then the preservative component may be provided exclusively within the coarse first grain mode or additionally within the coarse grain mode along with the second grain mode.

As discussed previously, the crystal structure and corresponding crystalline matrix of zirconia ceramics may be temperature-stabilized through addition of a stabilizing compound or element within the ceramic's composition. Such additives are referred to as "stabilizers." The present invention provides a functionally distinct stabilizing component referred to herein as a "preservative component," which in many embodiments may be provided within or as a component of the second grain matrix. Although the total mechanism of protection may not be fully understood, it is believed that the preservative component may preferably be added into or provided as the second grain mode to permit design and use of a first grain mode formulation that maximizes the desirable performance properties (e.g., via partial stabilization) without compromising the same due to the presence of a potentially performance compromising compound or constituent within the first grain mode. Thereby, the second grain mode preservative component is preferably coated upon and/or diffused into the first grain mode, both during initial sintering and on-going during use, forming a preservative-component-rich surface layer on the first grain mode. The coated surface layer thereby may desirably contain a higher concentration of the preservative component than that in the interior of the first grain mode crystals or particles. Thereby, the interior of the first mode structure may preferably remain partially stabilized, but yet also protected from premature or progressive degradation or loss of the stabilizer therein. The preservative component typically positions at the grain boundaries and grain surfaces. The stabilizer may tend to act sacrificially, passively, or otherwise to prevent loss or dissociation of the stabilizer or stabilizer effects. The preservative component-rich surface layer provides a higher thermodynamic activity level of preservative component than the interior of the first grain mode and thereby suppresses the progressive migration or loss of the preservative component from within the interior of the first grain mode. The preservative component-rich surface layer on the particles, preferably primarily on the coarse or first grain mode particles, facilitates improved chemical stability and the interior of the first grain mode retains proper stabilizer concentration, providing first or coarse mode zirconia crystal stability over extended duration of use. As mentioned previously, however, for applications where maintaining a partially stabilized coarse or first grain mode is not necessary, the preservative component may be included within the first grain mode, exclusively or additionally with respect to the second grain mode. In other embodiments, the preservative component may comprise a grain mode quantifiably distinct from the first and second modes.

Ceramic stabilizing components that may be suitable for use as either the first grain matrix oxide stabilizers, the second grit mode's second grain stabilizer, and/or as the preservative component include at least one weight percent, based upon the total weight of zirconia within such respective mode, of one or more of various stabilizing compounds, including yttrium-containing compounds, MgO, CaO, $Y_2O_3$, $CeO_2$, and mixtures thereof. Chemical addition of such stabilizer or preservative component may thereby result in partial formation of "cubic" zirconia crystal structure that is relatively crystalline-stable over the complete temperature range and does not undergo the detrimental thermal phase transformation. In some embodiments, such "stabilized zirconia" thereby includes at least one wt percent of stabilizer, in other embodiments at least two weight percent of stabilizer, and in still other embodiments a stabilized zirconia may include at least four weight percent of such stabilizer. For example, addition of about 16~27 mole percent (~25-45 wt. %) CaO stabilizer well mixed or dispersed within a $ZrO_2$ (zirconia) compound will generally "fully" stabilize the resulting zirconia ceramic material. This stabilization can render the zirconia structure into a cubic crystalline structure that remains in that structure over the relevant, broad temperature range, whereas unstabilized zirconias can change their crystal structure and weaken at high temperature. Other stabilizers require different percentages to fully stabilize a zirconia. For further example, about 8 mole percent (~14 wt. %) of $Y_2O_3$ mixed into the $ZrO_2$ provides a fully stabilized, cubic crystalline structure that is stable over the relevant temperature range, such as up to 2260° C. As a still further example, the critical concentration of MgO is about 12 mole percent (~20 wt. %) for full stabilization of a zirconia.

In some embodiments, the multimodal stabilized ceramic may further comprise one or more "secondary oxides" selected from the group consisting of Al, Si, Mg, Ca, Y, Fe, is Mn, Ni, Co, Cr, Ti, Hf, V, Nb, Ta, Mo, W, Sc, La, and Ce, and mixtures thereof. The secondary oxides may be merely incidentally present, such as via contamination or as a result of the manufacturing process. The secondary oxides may also be purposefully added, such as to improve certain properties or uses, e.g., such as processability during manufacture; or may be generated and deposited as a bi-product from the thermal process and other materials present. The amount of secondary oxides in the stabilized zirconia formed component may typically range from virtually none present up to 10 wt. %, or from 0.001 wt. % present up to 10 wt. %, or in some embodiments from 0.01 wt. % to 5 wt. %, or in still other embodiments from 0.1 to 3 wt. %, based on the weight of the formed stabilized zirconia component.

Zirconia containing sufficient stabilizer to render complete or substantially complete crystallization shift to cubic structure and a zirconia having an amount of stabilizer in excess thereof, is considered a "fully stabilized zirconia." In contrast, addition of less stabilizer than the amount required to create a fully cubic-crystalline Zirconia structure renders the zirconia structure a mixture of cubic and monoclinic phases and/or cubic and tetragonal crystal phases. Zirconia containing such limited or lesser amount of stabilizer additive such that there remains at least more than an incidental amount of monoclinic and/or tetragonal crystals, is referred to herein as "partially stabilized zirconia." The term partially stabilized zirconia is thus defined to include substantially any stabilized zirconia that has at least one weight percent of stabilizer but an insufficient amount of stabilizer to render a fully cubic-crystalline zirconia in substantially the whole zirconia. In yet another example, a stabilized zirconia may include a fraction of a percent of at least one of such stabilizer and another fraction of a percent of another of such stabilizer, such that the combined fractions make up at least one weight percent of the total weight of the zirconia and such additive. The terms "stability" or "stabilized" as used herein refers to the ceramic component's or matrix's ability to retain its crystallization structure in the presence of chemically reducing environments and across the relevant broad spectrum of relevant operating temperature.

For purposes of this invention, it may be considered that as the percentage of stabilizer increases from roughly none present toward increasing stabilizer presence and corresponding increased stabilization from partial toward full stabilization, the key strength and toughness properties generally tend to improve through the partial stabilization range. However, at some point approaching substantially complete cubic crystallization or full stabilization, these important strength and toughness properties may tend to digress slightly or become slightly reduced, across a broad temperature spectrum, as compared to such properties in a partially stabilized zirconia that has a mixture of cubic, monoclinic, and/or is tetragonal crystals. Depending upon the desired application, however, the full or more-fully stabilized zirconia may still be useful for some intended applications, while for many other applications the generally tougher and more fracture-resistant partially stabilized zirconia will be preferable, as explained below in more detail. In addition to degree of stabilization, the stabilized zirconia's performance may also be affected to varying degrees by other factors, such as grain size, grain distribution, packing density, stabilizer selection, processing additives, etc. By adding less stabilizer to the zirconia compound than the amount of such stabilizer required to completely stabilize all of the zirconia crystals (that is, "partial stabilization"), and also preferably by careful control of particle sizing, distribution, and processing, mixtures of the stabilized cubic phase and the unstable monoclinic phase are achieved that have very high fracture toughness.

However, as discussed above, it has recently been learned that extended exposure of stabilized refractory ceramic components, such as but not limited to stabilized zirconias, to high temperature processes and severe environments can result in progressive loss of stabilizer from the ceramic crystals, resulting in undesirable temperature-related re-alteration of the crystal structure over time. Loss of stabilizer or reduction in stabilizer activity from a stabilized coarse grain mode matrix can result in alteration and degradation of crystal matrix structure and result in a corresponding progressive digression in key properties, such as but not limited to, thermal shock resistance and/or flexural strength. Under certain conditions, some stabilizers may, to a varying extent, tend to dissociate out of a stabilized zirconia under high temperature and/or reducing conditions, rendering portions of the ceramic component essentially stabilizer-free or less stabilized than before such loss. It has also been recently learned that MgO and CaO may tend to dissociate more readily than yttrium-based stabilizers, but all stabilizers have some tendency to disassociate at temperatures in excess of 1500° C. Unfortunately, unstabilized or substantially unstabilized zirconia is unusable in many high stress applications since it goes through the detrimental phase transitions during heating and cooling cycles and becomes susceptible to unacceptable levels of stress cracking.

Surprisingly, it has recently been learned that it is possible to inhibit the loss from or to replace or otherwise retain the activity level of the lost stabilizer in, the zirconia matrix. The inventive materials preserve the crystalline matrix composition for an extended operational duration or life expectancy as compared to such structures that are not preserved according to this invention. In some embodiments, the extended stability is achieved in the first grain mode at least in part by the presence of a surplus or excess amount of stabilizer within the second grain mode. The relevant surplus or excess amount of stabilizer (e.g., the "preservative component") within one grain mode, such as within the second grain mode, is that amount or portion of stabilizer that is additional to or in excess of the portion of such stabilizer that is initially engaged in stabilizing or providing the desired crystal structure of the respective grain mode. In many preferred embodiments having no second grain mode stabilized ceramic present, then substantially all of composition of such second grain mode includes the preservative component.

To prevent the problematic occurrence of an unstabilized first grain ceramic matrix due to the described loss or dissociation of stabilizer therefrom, the present invention includes an abundance of stabilizer within the material or component that functions as a preservative agent. In many embodiments, the preservative component is provided within the second grain mode, although such additive may also be included within other grain modes, or provided within the mixture as its own definable, distinct grain mode. This preservative component may be in the form of an oxide or other chemical compound, such as but not limited to calcium oxide or yttrium oxide, yttrium sulfate, yttrium nitrate, etc, or in neat form such as substantially pure calcium or yttrium, or in the form of a fully stabilized ceramic having a amount of stabilizer in excess of the amount needed to partially stabilize the ceramic crystal. (It is noted that generally, pure elemental forms of metals such as yttria will generally convert to an oxide during sintering, but such pure forms may still be present in lesser concentrations or in non-fully-sintered compositions.) An exemplary stabilized ceramic having such excess stabilizer may be, for example, a fully stabilized zirconia. Since the stabilized ceramic is slightly tougher and stronger when partially stabilized than fully stabilized, the fine mode fully stabilized ceramic can function as the preservative component by donating some stabilizer or providing some shielding or stabilizing activity to the more coarse, preferably partially stabilized first grain mode regions wherein progressive loss of stabilizer might be most detrimental to performance properties. Alternatively, the preservative component portion of the fully stabilized zirconia of the second mode may function to increase the stabilizer activity in the adjacent first mode area that may have lost stabilizer, without compromising strength properties in either grain mode.

One method of introducing excess stabilizer or preservative component may be, to for example, to provide excessive amounts of stabilizer or preservative component within the second grit mode, such as via a fully stabilized ceramic or a fully stabilized ceramic having an excess of stabilizer therein.

Another method of introducing preservative component is, for example, to provide a stabilizer/preservative component as a distinct component, such as in the form of an oxide, neat element, or mixtures thereof, which may be in lieu of or in addition is to a stabilized ceramic (e.g., fully stabilized zirconia) in the second grit mode. The preservative component may thereby boost or supplement the chemical activity of first mode stabilizer during sintering and use, to account for or suppress progressive dissociation of stabilizer, thus prolonging zirconia crystal stability. Thereby, the inventive materials and methods extend the life span of the stabilized zirconia component and associated processes.

Two key materials properties are identified as having significant importance with regard to the high-severity performance of ceramics in thermal process reactors and their corresponding suitability for application in large scale thermal processes; namely, thermal shock resistance and mechanical flexural strength. Other properties, such as but not limited to crystalline/chemical stability at high temperature and toughness are also important and must be considered when selecting an appropriate ceramic materials or components for an application. Retention or maintenance of these key and other properties over the useful life of the ceramic component is typically desirable. With regard to maintaining longevity of such properties in components, one of the most important factors is the crystalline/chemical stability at high temperatures. The suitably fabricated component must retain its thermal shock resistance and mechanical flexural strength over a suitable life span by not prematurely degrading or undergoing crystalline alteration, such as due to loss of stabilizer. The instant inventions incorporate particular features that function to maintain or preserve the crystalline stability, thermal shock resistance, and mechanical flexural strength (MOR), and possibly other related properties, for extended periods of time as compared to the useful duration of one or more of such properties in materials lacking the inventive preservative features.

Regarding the two above-referenced important performance properties, (thermal shock resistance and mechanical flexural strength), thermal shock resistance of a ceramic component can be defined as the maximum change in temperature that the material can withstand without failure or excessive damage. Thermal shock resistance is an evaluated parameter but not a material property. Description of thermal shock resistance may depend upon the type of thermal cycle, component geometry, and strength as well as on material properties or factors. Simplified mathematical expressions relying upon a variety of assumptions can be used to describe material performance under a set of conditions. Alternatively, much more complex analyses may be performed using numerical analysis methods such as finite element and stress-strain analysis. However, for materials performance comparison purposes a qualitative or direct comparative analysis is also useful and more practical. Thermal shock resistance may be evaluated by means of rapid water quench experiments such as illustrated in ASTM C1525. Thermal shock damage results in a material from buildup of thermal and physical stresses, usually during rapid heating or rapid cooling.

For example, the ASTM C1525 thermal shock resistance test method builds on the experimental principle of rapid quenching of a test specimen (e.g., 1"×1"×⅛" square, or 2.54 cm×2.54 cm×0.32 cm square) from an elevated temperature (e.g., 1100° C.) into a water bath at room temperature. After water quenching, the specimen is dried and dye-penetrated to investigate both open and closed cracks. For instance, Zyglo® water washable dye penetrants may be used. As the zirconia samples are typically white or yellow, pink dye provides a vivid depiction of cracks and helps differentiate cracks from background or grain boundaries. Methods for determining the cumulative or total crack length per unit area in each specimen are known in the art and may be determined by scanning software electronically aggregating the lengths of all cracks, backed up with visual confirmation by the technician. The electronic scanner resolution or magnification is generally not critical, e.g., from as low as from 50× to as high as 1000×. The tester need only be able to differentiate actual cracks from mere grain boundaries. As with any specified parameter, the value determined must be made over a sufficiently large region to provide a statistically sound representation of the entire sample. The total crack length per unit area may be determined over such area by aggregating and averaging a number of smaller regions that collectively represent a statistically sound region. A whole component may be studied or one or more regions may be evaluated. The studied or relevant region(s) or the whole component may be considered a "component" for test purposes herein.

Utilizing propensity of cracks observed in a test specimen, the thermal shock resistance for a particular region or component may be normalized and qualitatively scored, such as from 1 (the least resistance) to 5 (the most resistance) as summarized hereunder:

1: Open cracks and many closed cracks.
2: Many closed cracks.
3: Some closed cracks.
4: Little closed cracks.
5: No cracks.

Figure 2:
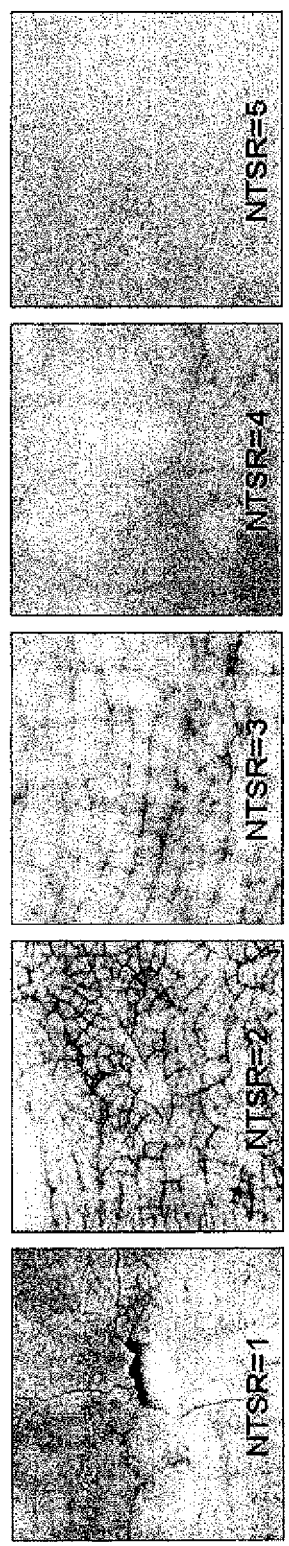
FIG. 2 provides photographic examples of stress cracking of various ceramic samples, each machine graded and ranked with a qualitative value from 1 to 5 to illustrate corresponding normalized thermal shock resistance.

The appearance of various degrees of cracking in rapidly quenched zirconia specimens or components and their corresponding qualitative, normalized thermal shock resistance (NTSR) value from 1 to 5 are illustrated in FIG. 2. A rating of 1 is least acceptable while a rating of 5 is most acceptable. The herein disclosed inventive compositions will typically produce a normalized NTSR rating of 3, 4, and 5. To quantify propensity of cracks observed in a thermal shock resistance test specimen, dye penetrated samples were optically scanned and subjected to an image analysis computer software program. For example, a total crack length per unit area of the test specimen may be measured by use of commercially available image analysis software, e.g., Clemex Vision PE, as reported in Table 1, and corresponding generally with the illustrative images of FIG. 2. (Other image analysis software applications are also available to similarly measure the total crack length of the specimen.)

TABLE 1

Illustrative examples of normalized thermal shock resistance (NTSR) index or rating, ranked from 1 to 5.

| NTSR Index | Measured total crack length per unit area (cm/cm²) | Criteria of total crack length (cm/cm²) |
|---|---|---|
| 1 | 81.2 | >50 |
| 2 | 25.6 | >20-≤50 |
| 3 | 16.5 | >5-≤20 |
| 4 | 3.5 | >1-≤5 |
| 5 | 0.01 | ≤1 |

The stabilized refractory grade zirconia of this invention preferably demonstrates a total crack length per unit area after quenching a test specimen of the inventive material from 1100° C. into a water bath at room temperature that is not greater than 5 cm/cm²; that is, it preferably has a NTSR of at least 4. Still more preferably, the stabilized refractory grade zirconia of this invention demonstrates a total crack length per unit area after quenching a test specimen of the stabilized refractory grade zirconia at 1100° C. into a water bath at room temperature that is more preferably not greater than 1 cm/cm$^2$; that is, more preferably has a NTSR of 5. However, for some less demanding applications, the inventive components may demonstrate crack lengths in excess of 5 cm/cm$^2$, but preferably not greater than 20 cm/cm$^2$, thus demonstrating a corresponding NTSR of 3 or higher. The intended application determines the range of acceptable crack length. Thus, materials according to the present invention include those having a thermal shock resistance rating of 4 or 5, as described herein.

As set forth in ASTM C 1525-04, thermal shock resistance can be assessed by measuring the reduction in flexural strength (MOR) produced by rapid quenching of test specimens heated across a range of temperatures. For purposes of the stabilized zirconia of this invention, regarding quantitative measurement of thermal shock resistance, a critical temperature interval may be determined by a reduction in the mean flexural strength of a determined amount, such as for example, at least 30%. However, the test does not determine thermal stresses developed as a result of a steady state temperature differences within a ceramic body or of thermal expansion mismatch between joined bodies. Further, unless the test is repeated several times, the test is limited in its ability to quantitatively determine the resistance of a ceramic material to repeated or cyclic shocks. Thus, it is preferred that the test be repeated to analyze the effect of cyclic temperature shocks, such as may be experienced in a regenerative reactor.

Another key ceramic performance property with respect to the instant invention is flexural strength, which can be measured by 3-point bending tests as illustrated in ASTM F417. The test specimen, a small bar of square cross section, rests on two cylindrical supports in a compression test machine. It is bent by the application of force, at mid-span, to the opposite face of the bar from that resting on the two supports. The bending force is applied by a third cylinder (identical to the other two) at a prescribed constant rate until the specimen breaks. The breaking rod, the dimensions of the specimen, and the test span are used to calculate flexural strength.

As a ceramic material is heated, its density typically increases as a result of pore shrinkage due to the sintering effect caused by the heat. Sintering may result in some of the ceramic crystals or components therein melting or undergoing other high temperature fusion or shrinkage, resulting in a slight decrease in bulk volume, but with an increase in component strength. Thus, as a ceramic is heated, its modulus of rupture mechanical flexural strength (MOR) may typically also correspondingly increase slightly. However, when the hot ceramic is subjected to relatively quick cooling, such as via water quenching, stress fractures may be introduced thereby causing a weakening or reduction in the mechanical flexural strength. The combination of the multimodal grains and the porosity remaining after sintering results in a lattice type structure that provides the improved strength, heat stress dissipation and handling characteristics, and cyclic thermal stress resilience. The preservative component prevents degradation of these desirable properties, thereby extending component life.

The claimed MOR and thermal shock property values refer to those property values determined after sintering, unless stated otherwise. ASTM 1505 describes the process for MOR determination. Limited duration exposure of the sintered component to annealing temperatures in excess of 1500° C., such as in excess of 1600° C. or at least 1800° C., may further refine the component properties as described herein. Such further thermal processing or annealing may generally further improve the strength and thermal shock resistance of the inventive components and reactors as compared to such properties after original sintering. After such "annealing" of the sintered component, such as at temperatures in excess of commercial use temperature, such as at an exemplary temperature of at least 1800° C. for two hours, the formed ceramic component according to this invention will demonstrates a is retained porosity at ambient temperature in the range of from 5 to 45 vol % based upon the formed volume of the component. Such components also demonstrate a flexural strength (MOR) of at least 6 kpsi, preferably at least 10 kpsi, and provide a thermal shock resistance rating of at least four (4), preferably at least five (5). The MOR flexural strength of the zirconia ceramic used for materials and reactor components according to this invention should be greater than or equal to about 6 kpsi (41.3 MPa) after initial sintering to at least 1500° C. and subsequent quenching to ambient temperature. Also, the MOR is preferably greater than or equal to about 6 kpsi (41.3 MPa) when the sintered component is further thermally conditioned, such as by reheating and quenching (e.g., annealed) to operating conditions. For example, the thermal conditioning may entail reheating the component to a temperature in a range such as from 1500° C. to 1800° C. or perhaps even up to 2000° C. Surprisingly, many of the inventive components routinely demonstrate a MOR of at least 6 kpsi (41.3 MPa) after further thermal processing. The combination of a normalized thermal shock resistance rating of 4, with such MOR strength is recognized herein as a minimal MOR and shock resistance properties that are necessary across the required broad reactor temperature spectrum to provide for long-term commercial utilization of high temperature pyrolysis chemistry processes, over a desired life cycle of the reactor component. The preservative component of this invention functions to prolong these properties of the component within that range of acceptability, correspondingly extending the useful life of the component and process. If desired, the effect of long duration MOR changes may also be evaluated to determine commercial suitability, such as the MOR after, say for example, one month of cyclic processing (annealing). The components and apparatus of the subject invention, however, are expected to provide life duration for the relevant components and apparatus beyond the level that was previously available in the art.

In one aspect, this invention includes a refractory material, such material having application in one aspect for use with a regenerative thermal pyrolysis reactor apparatus, such as for components useful for pyrolyzing a hydrocarbon feedstock (e.g., petroleum liquids, gas, or coal). In other aspects, this invention may be utilized for pyrolyzing or otherwise thermally processing various feedstocks other than hydrocarbon feeds at high temperature, such as but not limited to other high temperature chemical processes, reactions, such as but not limited to using various oxidizable, flammable, combustible, or otherwise thermally reactive materials, whether solid, liquid, or gas. Although the inventive materials are useful at high temperatures (>1500° C.), they may also be useful in various lower temperature applications. The term "hydrocarbon feedstock" as used herein is defined broadly to include virtually any hydrocarbonaceous feed and may also include substantially carbonaceous feeds such as graphite or coke. Exemplary hydrocarbon pyrolysis feedstocks that may have particular applicability for use in the present invention typically comprises but are not limited to one or more hydrocarbons such as methane, ethane, propane, butane, naphthas, gas oils, condensates, kerosene, heating oil, diesel, hydrocrackate, Fischer-Tropsch liquids, alcohols, distillate, aromatics, heavy gas oil, steam cracked gas oil and residues, crude oil, crude oil fractions, atmospheric pipestill bottoms, vacuum pipestill streams including bottoms, heavy non-virgin hydrocarbon streams from refineries, vacuum gas oils, low sulfur waxy residue, heavy waxes, coal, graphite, coke, tar, atmospheric residue, heavy residue hydrocarbon feeds, and combinations thereof. Undesirable fractions, solids and non-volatiles contained in the feedstreams may optionally be removed by one or more separation techniques, prior to feeding a volatizable fraction into the reactor. Diluents or other additives, such as but not limited to steam, water, methane, and hydrogen, may also be included within the feedstreams.

This invention includes but is not limited to use of components, apparatus, reactors, and methods disclosed in various, previous patent applications, the entirety of each of which are included herein by reference, including (i) U.S. application Ser. No. 60/753,961, filed Dec. 23, 2005, titled "Controlled Combustion for Regenerative Reactors," (ii) U.S. application Ser. No. 11/639,691, filed Dec. 15, 2006, titled "Controlled Combustion for Regenerative Reactors;" (iii) U.S. application Ser. No. 11/643,541, filed Dec. 21, 2006, titled "Methane Conversion to Higher Hydrocarbons;" and (iv) U.S. patent application Ser. No. 12/119,762, filed May 13, 2008, titled "Pyrolysis Reactor Conversion of Hydrocarbon Feedstocks Into Higher Value Hydrocarbons." These patent applications teach and disclose various apparatus and methods for pyrolyzing hydrocarbon feeds in reverse flow regenerative pyrolysis reactors, including deferred combustion and controlled heat positioning processes. The inventions disclosed in this present invention may be suitable for use with but not limited to reactors as disclosed in these previous applications. In some embodiments, the inventive components and reactors may comprise reverse flow regenerative pyrolysis reactor systems, including but not limited such systems that may utilize deferred combustion in a reverse flow reactor to heat the reactor core. The inventive components provide the strength, thermal shock resistance, and chemical stability required to enable commercialization of such apparatus and processes to operate at temperatures of at least 1500° C., and even in some embodiments in excess of 1600° C., in still other embodiments in excess of at least 1700° C., and in even other embodiments at temperatures in excess of 2000° C. The inventive components, apparatus, and process provides for a large-scale, cyclic, reverse-flow reactor system that is useful and operable on a commercially desirable scale and life cycle.

Grain size or particle size, refers to the diameter or geometric size of individual grains of the matrix comprising a multimodal grain distribution. Grains are distinct from crystallites and from the various crystals that constitute a particle or grain, although a grain may be comprised of a single crystal. A single grain can comprise one or several crystallites. A crystallite can comprise one or several crystals, a crystal being a solid-state matter that has uniform structure. A grain or particle is the individual ceramic or stabilizer granular material that forms the solid matrix for the ceramic component. The grains or particles are sintered and bonded together at grain boundaries to create a formed ceramic component. Dynamic light scattering and laser light diffraction analysis using a unified scatter technique (Microtrac® 3500) can be used to determine average particle size and particle size distribution. Microtrac® instruments can measure particle size ranging from 0.024 to 2800 μm and provide good instrument-to-instrument agreement, sample-to-sample agreement, instrument internal repeatability and particle distribution breadth.

The "D50" or average particle size measured by a laser light diffraction method is one type of average particle size represented as D50 or mean diameter. The D50 average particle size is a value determined by using a particle size distribution measuring device and represents a particle sample cut diameter which is the 50% volume or weight fraction value after determining the minimum and maximum sizes contributing to the integrated volume of a specific peak of a particle size distribution. Similarly D90, D10, D99 respectively corresponds to the 90, 10 and 99% volume or weight fractions of the particle size distribution. The average (D50) or any other particle size cut value can be determined by microscopy methods such as optical microscopy (OM), scanning electron microscopy (SEM) and transmission electron microscopy (TEM). The average particle size values measured by microscopy methods also can be converted to D50 values by methods known in the field. The particle size distribution of the first grains alternatively can be determined by a sieve and mesh classification method as known in the art.

In some embodiments, the inventive materials, components, and reactor systems may include a first grain mode zirconia ceramic composition having a D50 grain size in the range of from 0.01 μm up to 2000 μm, while in other embodiments the reactor system may include a first grain mode zirconia ceramic composition having a D50 grain size in the range of from 5 μm to 800 μm. The size preference may be determined by the particular component being prepared. For example, larger, bulkier components such as structurally is demanding components may utilize grain sized within the broader range, while more intricate or delicate components such as thin-walled honeycomb monoliths might benefit from smaller grain sizes within the latter range.

The composition includes at least a first grain mode comprising a stabilized zirconia ceramic that is stabilized with a matrix oxide stabilizer and a second grain mode. The composition also includes a preservative component. In many embodiments, the first grain mode comprises partially stabilized zirconia. In many embodiments, the partially stabilized first grain mode zirconia may be stabilized by yttria or an yttria containing compound, such as but not limited to yttria oxide. In other embodiments, the stabilizer may be another stabilizer, such as Mg, Ca, Ce, MgO, CaO, $Y_2O_3$, $CeO_2$, or mixtures thereof.

In many embodiments, the second grain mode comprises stabilized ceramic, preferably a stabilized zirconia, and preferably a fully stabilized zirconia. The stabilized second grain mode ceramic includes a second grain mode stabilizer, such as Y, Mg, Ca, Ce, MgO, CaO, $Y_2O_3$, $CeO_2$, or mixtures thereof. The preservative component may comprise either a material separate from the second grain stabilizer, or may be comprised of the second grain stabilizer, particularly an excess amount of the second grain stabilizer beyond that amount that is engaged in stabilizing the second grain mode stabilized ceramic. In other embodiments, the second grain mode may consist essentially of the preservative component, wherein such preservative component comprises a stabilizing material, such as yttria, Mg, Ca, Ce, MgO, CaO, $Y_2O_3$, $CeO_2$, or mixtures thereof. In many embodiments, the preservative component comprises or consists of the same materials that are used to stabilize the first grain ceramic. In many such embodiments the first grain matrix oxide stabilizer and preservative component include yttria, either neat or as part of a compound, while others may include MgO, CaO, $Y_2O_3$, $CeO_2$, or mixtures thereof.

In many embodiments, the material comprises a ceramic grain distribution including partially stabilized zirconia in at least the first mode but also possibly a partially stabilized or fully stabilized zirconia in the second mode. In some embodiments, the second grain mode comprises at least 14 wt. % of a preservative component (fully stabilized), or sometimes at least 15 wt. %, 20 wt. %, 30 wt %, 50 wt. %, 80 wt. %, 90 wt.

%, 95 wt. %, 99 to wt. % or in some embodiments the second grain mode may consist essentially of preservative component, based upon the weight of the second grain mode.

The combination of enhanced packing density due to the multimodal nature of the structure, plus the porosity, plus preservative component uniquely provides an improved combination of MOR flexural strength, thermal shock resistance, and component life expectancy that was not previously known in the industry. The inventive composition comprises a multimodal grain distribution suitably designed for close packing and corresponding high density, while at the same time providing a well distributed porosity throughout the packed matrix. The multimodal grain distribution facilitates closely packing the component grains which provides density and commensurate MOR strength. However, the multimodal distribution according to this invention provides at least a minimum amount of matrix porosity, such as at least 5 vol % and preferably at least 10 vol %, up to 45 vol % porosity, or in some embodiments up to 30 vol %, based upon the bulk volume of the inventive material. The porosity feature of the matrix facilitates small scale matrix flexibility among the matrix particles while also permitting dissipation of both mechanical and thermal stress concentrations (particularly with respect to arresting crack propagation). The porosity also provides high surface area for improved heat absorption and dissipation, as compared to typically less-porous, high-density, high-strength ceramics such as other refractory and engineering grade ceramics. The porosity feature is attributed with providing improved thermal stress crack resistance by inhibiting crack formation and arresting crack propagation, and simultaneously facilitating some elastic deformation of the matrix structure, thereby providing enhanced service life in the stressful, high temperature, cyclic thermal applications. The porosity of the ceramic matrix of the formed ceramic component is measured at ambient temperature, such as at 20° C., after sintering for at least ten minutes at 1500° C., (and also even after two hours of further annealing at temperatures above 1500° C., such as up to 1800° C. or even up to 2000° C.) is in the range of from 5 to 45 vol %, or sometimes in the range of from 10 to 30 vol %, based on the bulk volume of the formed ceramic component. The porosity created in or among the closely packed grains is preferably substantially uniformly dispersed throughout the composition.

In addition to improved density, the close grain packing also facilitates enhanced sintering among the coarse grits as compared to sintering of only a narrow grain size embodiment. The limitations on ratio of second grit mode grain size versus size of the first or coarse grit mode particles provide a range of formed ceramic component properties that may be preferred for use in certain components or reactors useful for commercial scale applications for performing high temperature thermal or pyrolysis processes. Second grit mode particles fit within the interspatial gaps, adjacent the tangent point between coarse grits and provide close packing and corresponding high packing density. Second grits at or near the tangent between coarse grits may also enhance bonding after sintering the multimodal mix. The resulting adherent bonding between coarse grits is also at least partly responsible is for the corresponding high density and improved flexural strength of the ceramic composition. A desired porosity value with the above range may be application-defined and may be facilitated during manufacture or preparation of the formed ceramic composition such as by controlling certain manufacturing or preparation properties, such as but not limited to grain size selections and ratios of amount of coarse versus second grains, mixing energy and methods, extrusion or pressing forces applied to the component during formation, sintering temperature and time, etc. For example, preparation of the formed ceramic component prior to sintering may utilize a lower extrusion pressure or compaction pressure than is traditionally utilized in manufacture of engineering grade or even some refractory grade ceramics, whereby grain compaction is controlled to avoid over-compaction. Preparation method may be adjusted as needed to yield a formed ceramic component or reactor that includes the desired porosity.

The particles comprising the multimodal grain distribution can be substantially any shape. In many embodiments, a preferred shape may be those particle shapes that are substantially spherical or more spherical in dimensions than non-spherical. Some non-limiting acceptable examples include spherical, ellipsoidal, polyhedral, distorted spherical, distorted ellipsoidal, distorted polyhedral shaped, angular, rectangular, tetrahedral, quadrilateral, elongated, etc. The shape of second grain particles may generally be of less importance than the shape of first grain particles. Spherical first grain is particularly beneficial in providing close packing, density, optimum porosity, and flowability during powder processing and fabrication. A preferred spherical shape of the first grain can be characterized by an aspect ratio less of than 2.5, or preferably less than 2.0, or more preferably less than 1.5. Grains with generally smoother surfaces may also be preferred as compared to grains having highly irregular surface shapes.

Spherical shape refers to a symmetrical geometrical object where the set of all points in three dimensional space ($R^3$) which are at the distance R from a fixed point of that space, where R is a positive real number called the radius of the sphere. The aspect ratio of a shape is the ratio of its longest axis to its shortest axis. The aspect ratio of symmetrical objects may also be described by the ratio of two measures (e.g. length and diameter). The aspect ratio can be measured by microscopy methods such as optical microscopy (OM), scanning electron microscopy (SEM), and transmission electron microscopy (TEM), in combination with image analysis software, wherein a two-dimensional shape is projected.

The particles or grains can be either single crystalline or polycrystalline. Polycrystalline grain is made of many smaller crystallites with varying orientation. Various is types of grains can be utilized which include but are not limited to agglomerated and sintered, fused and crushed, and spherodized. In one form, the grains are agglomerated and sintered powder which is produced by spray drying of a suspension consisting of fine powders and organic binder and subsequent sintering. In another form, the grains are fused and crushed, which is produced by fusing in arc furnaces and crushing of the cold block. In still another form of the disclosure, the grains are spherodized, such as by atomization of agglomerates using a plasma flames to fabricate substantially spherical shaped particles.

The superior thermal shock resistance, relative chemical inertness, preserved crystalline structure, improved flexural strength, and high temperature capability of the inventive compositions, components, and reactors of the present invention provide crystalline stability and structurally soundness under cyclical thermal conditions at temperatures of 1500° C. and higher, such as up to 1700° C., 1800° C., or in some embodiments, up to 2000° C., particularly as compared to prior art refractory and thermal components and reactors. Such attributes and properties may facilitate components and reactors that can replace conventional refractories and also facilitate use of processes in relatively large scale commercial applications that were previously not economical or technically achievable. In particular, the heat stable, formed ceramic components, reactors, and processes may find particular application in refining, petrochemical, chemical processing, and other high temperature thermal applications. It is believed that the improved combination of properties provided according to the present disclosure may facilitate commercial service periods of greater than 1 year, for example even up to about 10 years in some applications.

In one form, the inventive material and components may be prepared by manufacturing techniques such as but not limited to conventional ceramic powder processing techniques, e.g., mixing, milling, pressing or extruding, sintering and cooling, employing as starting materials a suitable ceramic powder and a binder powder in the required volume ratio. Certain process steps may be controlled or adjusted to facilitate manufacture of the desired porosity range and performance properties. For example, the two or more modes of powders, oxides, preservatives, and/or stabilizers may be milled in a ball mill in the presence of an organic liquid such as ethanol or heptane for a time sufficient to substantially disperse the powders in each other. Excessive binder powder and liquids may be removed and the milled powder dried, placed in a die or form, pressed, extruded, formed, caste or otherwise formed into a desired shape. The resulting "green body" is then sintered at temperatures of at least 1500° C. and commonly up to about 1800° C. for at least ten minutes, and often for times is typically ranging from about 10 minutes to about two hours and in some applications even up to 4 hours. The sintering operation may be performed in an oxidizing atmosphere or inert atmosphere, and at ambient pressure or under vacuum. For example, the oxidizing atmosphere could be air or oxygen, the inert atmosphere could be argon, and a reducing atmosphere could be hydrogen. The sintering atmosphere, temperature, and kiln environment may also introduce secondary oxides (as discussed previously herein) into the component, either desirably or undesirably, as a contaminant or desired/permitted constituent of the ceramic component. Thereafter, the sintered body is allowed to cool, typically to ambient conditions. The cooling rate may also be controlled to provide a desired set of crystal sizes and performance properties in the particular component.

More particularly, the advantageous properties and/or characteristics of the multimodal ceramics are realized in part from the close packing of the ceramic grains, wherein one mode of a bimodal grain distribution includes a D50 first grain particle size in the range of from 5 to 2000 µm, or from 5 to 800 µm; and the second grain mode of grain distribution, including the preservative component, includes a D50 particle size in the range of from at least about 0.01 µm to not larger than one-fourth (¼) of the D50 grain size of the first grain. The second grains are substantially evenly disbursed within the first grains. According to the present invention, the size of the preservative component particles is in some embodiments consistent with the size limitations for the other particle size limitations and ranges pertaining to the second grain mode. In one embodiment, for example, the second grains may include a D50 size value that ranges from 0.01 to 100 µm. In other embodiments, for example, the fine mode grains may include a D50 size value that ranges from 0.05 to 44 µm, while in still other embodiments the fine mode grains include a D50 size value that ranges from 0.05 to 5 µm. For example, in one embodiment, the first grain mode includes a D50 size that ranges from 20 to 200 µm, while the corresponding second grain mode may range from 0.05 to 5.0 µm. In still other embodiments, the second grain mode may include a D50 average size diameter not greater than one-eight the D50 size of the corresponding first grain mode. In some embodiments the D50 size of the fine mode grains may not exceed one tenth the D50 size of the first mode grains (e.g., not larger than one order of magnitude smaller than the first grain mode), while in other embodiments the D50 size of the second grain mode will generally be less than about two orders of magnitude smaller than the D50 size of the first grain mode (e.g., the second grains are sometimes not larger than about 100 times smaller than the D50 diameter of the first grains.) In other embodiments, the size of the preservative component particles may be consistent with the size of the first mode is particles or have a size distribution relatively distinct from the size of either or both of the first and second modes.

In one non-limiting exemplary form, a grain distribution of partially stabilized zirconia particles with a first grain size distribution of 21 to 65 µm and a second grain size distribution of 0.05 to 2 µm and are utilized. In still yet another exemplary embodiment, a bimodal distribution of stabilized zirconia particles with a first grain size distribution of 30 to 120 µm and a second grain size distribution of 0.1 to 5 µm are utilized. In still yet another exemplary form, a bimodal distribution of stabilized zirconia particles with a first grain size distribution of 40 to 200 µm and a second grain size distribution of 0.1 to 10 µm are utilized. In yet another exemplary form, a distribution of stabilized zirconia particles with a first grain distribution of 100 to 500 µm and a second grain distribution of 1 to 20 µm are utilized.

For example, for various embodiments the D50 lower limit of the second grain stabilized zirconia may be 0.01 or 0.05 or 0.5 or 1 or 5 µm in diameter. A practical D50 lower limit on the second grain stabilized zirconia grains for many embodiments may be about 0.1 µm. Grains smaller than 0.1 µm may tend to be of limited usefulness in many applications due to the fact that such small grains may not distribute evenly and tend to melt together and combine into sintered grains that are of about the same size as do grains that are at least 0.1 µm. The stabilized zirconia and stabilizer grains that are of at least about 0.1 µm in diameter typically do not change size during or after sintering, whereas the nanoparticles may tend to combine into larger particles. For at least these reasons, the second grain mode of many embodiments of the subject invention might not include nanoparticle D50 size grit, unless such mode is purposefully introduced into and mixed with the coarse and second grain modes as a third or other mode, or as a secondary oxide. Commonly, nanoparticle modes of zirconia or stabilizer may generally only be considered as the second grain mode of the multimode structure when such grains are of sufficient presence to combine with each other to provide a second grain mode after sintering that provides mode grains of at least 0.01 µm after sintering and more preferably at least 0.1 µm after sintering. The D50 upper limit of the second grain mode, including the preservative component particles, may be 100 or 44 or 20 or 15 or 10 or 5 or 1 µm in diameter. The D50 lower limit of the first grain stabilized zirconia may be 5 or 20 or 25 or 30 or 40 or 100 µm in diameter. The D50 upper limit of the first grain stabilized zirconia may be 800 or 500 or 200 or 100 or 50 µm in diameter. The lower size limitation however, for the second grain mode, including the limitation for the preservative component particles therein, is consistent with size limitations for the other is particle size limitations and ranges pertaining to the second grain mode and is a D50 diameter of at least 0.01 µm, and sometimes preferably at least 0.1 µm.

In still yet another exemplary form, the D50 average particle size of the first grains may be about 30 µm and the D50 average particle size of the second grains is about 0.3 µm. In another non-limiting exemplary form, the D50 average particle size of the first grains is about 50 µm and the D50 average particle size of the second grains is about 0.5 µm.

In yet another non-limiting exemplary form, the D50 average particle size of the first grains is about 100 μm and the average particle size of the second grains is about 1.0 μm. In yet another non-limiting exemplary form, the D50 average particle size of the first grains is about 500 μm and the D50 average particle size of the second grains is about 5.0 μm.

A non-limiting example of a multimodal (bimodal) grain distribution may include from 1 to 20 wt. % of second grain particles and 80 to 99 wt. % of first grain particles. Another non-limiting example is a grain distribution that includes from 1 to 50 wt. % of second grain particles and 50 to 99 wt. % of first grain particles. Yet another non-limiting example is a grain distribution that includes from 1 to 80 wt. % of second grain particles and 20 to 99 wt. % of first grain particles Still another suitable, non-limiting example of a bimodal grain distribution includes 20 to 30 wt. % of first grains, such as but not limited to a D50 particle size of 30 μm, and 70 to 80 wt. % of second grains, such as but not limited to a D50 particle size of 0.3 μm. Another suitable, non-limiting example of a bimodal grain distribution includes 30 to 40 wt. % of first grains, such as but not limited to a D50 particle size of 30 μm, and 60 to 70 wt. % of second grains, such as but not limited to a D50 particle size of 0.3 μm. Another suitable, non-limiting example of a bimodal grain distribution includes 50 to 70 wt. % of first grains, such as but not limited to a D50 particle size of 30 μm, and 30 to 50 wt. % of second grains, such as but not limited to a D50 particle size of 0.3 μm. Another suitable, non-limiting example of a bimodal grain distribution includes 85 to 99 wt. % of first grains, such as but not limited to a D50 particle size of 30 μm, and 1 to 15 wt. % of second grains, such as but not limited to a D50 particle size of 0.3 μm. Yet another suitable, non-limiting example of a bimodal grain distribution includes 94 to 99 wt. % of first grains, such as but not limited to a D50 particle size of 30 μm, and 1 to 6 wt. % of second grains, such as but not limited to a D50 particle size of 0.3 μm.

Another non-limiting example of an exemplary, generally bimodal grain distribution includes 20 wt. % first grain with a D50 particle size of 40 μm, and 80 wt. % second grain particles with a D50 particle size of 1.0 μm. Another non-limiting example of an exemplary bimodal grain distribution includes 50 wt. % first grain with a D50 particle size of 40 μm, and 50 wt. % second grain particles with a D50 particle size of 0.4 μm. Another non-limiting example of an exemplary bimodal grain distribution includes 88 wt. % first grain with a D50 average particle size of 50 μm, and 12 wt. % second grain particles with a D50 average particle size of 0.5 μm. Still another non-limiting example of a bimodal grit includes 85 wt. % of first grain with an average particle size of 100 μm, and 15 wt. % of second grain with an average particle size of 1.0 μm. The wt. % of the second grain size distribution may be, for example, from 1 to 80 wt. % or 1 to 50% wt. % or 1 to 20% or 2 to 15% with the remaining grains constituting the coarse grit or other mode size distributions such as larger, smaller, or intermediate distributions. Such exemplary grain size distributions may provide a useful density and porosity combination suitable for various pyrolysis applications.

In one embodiment, the invention includes a refractory material comprising: (i) at least 20 wt. % of a first grain mode, the first grain mode comprising a stabilized zirconia having a D50 grain size in the range of from 5 to 800 μm based upon the total weight of the refractory material, the stabilized zirconia including a matrix oxide stabilizer; (ii) at least 1 wt. % of a second grain mode having a D50 grain size in the range of from 0.01 μm up to not greater than one-fourth the D50 grain size of the first grain mode stabilized zirconia, based upon the total weight of the refractory material; and (iii) at least 1 wt. % of a preservative component (with respect to the total weight of the material or component); wherein after sintering the material has porosity measured at 20° C. (e.g., room or ambient temperature) in the range of from 5 to 45 vol %. The preservative component may be included within (that is, associated with by virtue of grain size) the first mode, second mode, and/or as a separate mode. The "at least 1 wt. %" minimum threshold determination is made by aggregating the sum of all preservative component present within the material and does not require that any specific mode include at least 1 wt. %. This includes not only the separately distinguishable preservative component material that is present in one or more modes to function as the preservative component, but also the portion of stabilizer that is present within a mode that is in excess of the amount of such stabilizer that is functioning to provide at least partial crystal stabilization within a mode. Although determination of the latter may be difficult to accurately or consistently assess or define, it is deemed that a fully stabilized mode or a substantially fully stabilized mode contains sufficient stabilizer acting as preservative component such that it meets the "at least 1 wt. %" minimum threshold.

In other embodiments, the inventive material comprises at least 10 wt. % of is combined weight of the preservative component, the matrix oxide stabilizer, and optionally a second grain mode stabilizer, based upon the total weight of the refractory material. In still other embodiments, all three of the preservative component, the matrix oxide stabilizer, and optional second grain mode stabilizer will each include or consist essentially of the same stabilizer material, such as but not limited to an yttrium-containing compound, CaO, MgO, $Y_2O_3$, $CeO_2$, and mixtures thereof.

In other embodiments, the second grain mode comprises a fully stabilized zirconia, the fully stabilized zirconia being stabilized by at least 14 wt. % of a second grain zirconia stabilizer based upon the weight of the second grain stabilized zirconia. As discussed above, at least a portion of the at least 14 wt. % functions to stabilize the crystal structure while at least another portion is acting as the claimed minimum of "at least 1 wt. %" of preservative component to offset the progressive loss of stabilizer from the first mode stabilized zirconia. Yttria is one of the most active stabilizers and generally has the lowest weight fraction requirement (e.g., ~14 wt. % or 8 mole % yttria) among the stabilizer component candidates to render a zirconium fully stabilized. As for defining this aspect of the invention, this same 14 wt. % limit is applied to all other stabilizer candidate materials other than yttria and is also deemed by definition to meet the "at least 1 wt. %" minimum amount of preservative component present.

In some embodiments, the second grain mode comprises both the preservative component and a stabilized zirconia. Often, each of the preservative component and the second grain zirconia stabilizer comprises substantially the same compounds as comprise the first grain matrix oxide stabilizer. For embodiments that comprise a fully stabilized zirconia in the second grain mode, the second grain fully stabilized zirconia is stabilized by a second grain mode zirconia stabilizer.

In many embodiments, the second grain mode comprises at least 15 wt. % of combined weight of second grain mode stabilizer and preservative component, based upon the weight of the second grain mode. Such minimum aggregated amount obviates the need to rigorously distinguish between the amount of stabilizer acting to stabilize the crystal structure and the excess amount available to support the progressive loss of stabilizer from within the first grain mode. In other embodiments, the refractory material comprises at least 20 wt. % of combined weight of the first grain mode matrix oxide stabilizer, second grain mode stabilizer and preservative component, based upon the total weight of the material. In other aspects, the aggregate weight of the matrix oxide stabilizer, the preservative component, and an optional second grain mode stabilizer comprises at least 10 wt. %, and sometimes at least 15 wt. % of the weight of the material, based upon the total weight of the material. In some embodiments, the preservative component is provided within at least two of the first grain mode, the second grain mode, and an optional another grain mode. In another aspect, the preservative component may be provided substantially within only the second grain mode.

In other versions, the invention includes a stabilized refractory ceramic component that is suitable for use with a pyrolysis reactor, the component including; (i) at least 20 wt. % of first grain mode, the first grain mode including stabilized zirconia having a grain size in the range of from 5 to 800 µm based upon the total weight of the component, the stabilized zirconia including a matrix oxide stabilizer to stabilize the first grain mode stabilized zirconia; and (ii) at least 1 wt. % of a second grain mode having a D50 grain size in the range of from 0.01 µm up to not greater than one-fourth the D50 grain size of the first grain mode, dispersed within the first grain mode, based upon the total weight of the refractory ceramic component, the second grain mode comprising at least 1 wt. % of a preservative component based upon the weight of the second grain mode, to stabilize the first grain mode stabilized zirconia; wherein after sintering, the component has porosity at ambient temperature in the range of from 5 to 45 vol. %, based on the volume of the component. In such embodiments, the preservative component may be provided as a component of a stabilized ceramic compound within the second grain mode, such as a stabilized zirconia. In some of such aspects, the stabilized zirconia may comprise a fully stabilized zirconia, wherein the fully stabilized zirconia is stabilized by at least 10 wt. %, preferably at least 14 wt. % (e.g., fully stabilized) of a second grain zirconia stabilizer based upon the weight of the second grain stabilized zirconia. In some of such embodiments, at least a portion of the second grain zirconia stabilizer functions as the preservative component and preferably but not necessarily, the second grain zirconia stabilizer, the first mode stabilizer, and the preservative component comprise substantially the same compounds.

In still other embodiments the second grain zirconia stabilizer includes a stabilizer other than the first grain matrix oxide mode stabilizer and the second grain mode further comprises separately, a preservative component that is also preferably substantially the same compound as comprises the first grain mode matrix oxide stabilizer. In some embodiments, the second grain mode comprises at least 14 wt. %, 15 wt. %, 20 wt. %, or 50 wt. % of combined weight of stabilizer and preservative component, based upon the weight of the second grain mode, while in still other embodiments, the second grain mode comprises at least 80 wt. %, or 90 wt. %, or 95 wt. % of preservative component, based upon the weight of the second grain mode. In still other embodiments, the second grain mode may consist essentially of preservative component.

The second grain mode comprises at least 1 wt. % of preservative component, or at least 5 wt. %, 10 wt. %, 15 wt. %, 20 wt. %, 50 wt. %, 80 wt. %, 90 wt. %, or substantially 100 wt. % preservative component, based upon the weight of the second grain mode. The preservative component includes that amount of stabilizer that is in excess of the stabilizer that is engaged in stabilizing the crystal structure of the respective mode in which such component is located. The amount of preservative component is that amount of stabilizer present that is in addition to the stabilizer (if any) that is employed stabilizing the second grain zirconia if present. When the second grain zirconia is present, typically the second grain zirconia is stabilized by at least 10 wt. % of second grain matrix stabilizer and more typically at least 14 wt. % as required to achieve a fully stabilized zirconia. The preservative component portion thereby includes that portion of stabilizer that is additional to the amount (typically at least 14 wt. %, but may be other greater percentages) utilized in stabilizing the second grain zirconia matrix. Consequently, in some embodiments, the second grain mode may comprise at least 5 wt. % of stabilizer material (partially stabilized second grain mode embodiments) and at least 1 wt. % of preservative component, the 1 wt. % preservative component either in form of a distinct additional material or additive with respect to the 5 wt. % of second grain stabilizer material or an additional portion of the stabilizer material that is incremental to the 5 wt. % of second grain stabilizer material (for example, a portion of stabilizer material over 5 wt. % stabilizer within a fully stabilized zirconia). In other embodiments, the second grain mode comprises at least 10 wt. % (at least partially stabilized), 14 wt. % (fully stabilized, wherein at least a portion of the stabilizer functioning as the preservative component), 15 wt. %, or at least 20 wt. % of combined weight of stabilizer and preservative component, based upon weight of the second grain mode.

According to some other embodiments of invention, the first grain mode comprises at least 20 wt. % of the total weight of the refractory material, based upon the total weight of the refractory material. In some embodiments, the first grain mode comprises at least 50 wt. % of the multimodal grain distribution, based upon the total weight of the multimodal grain distribution. In other embodiments, the first grain mode comprises up to 99 wt. % of the total weight of the multimodal grain distribution, based upon the total weight of the multimodal grain distribution.

In some aspects, the inventive distribution may comprise from 1 to 20 wt. % of second grain mode and from 80 to 99 wt. % of first grain mode, based upon the total weight of the multimodal grain distribution. In other aspects, the inventive multimodal distribution is may comprise from 1 to 50 wt. % of the second grain mode and from 50 to 99 wt. % of the first grain mode, based upon the total weight of the multimodal grain distribution. Still other embodiments may include from 1 to 80 wt. % of the second grain mode and from 20 to 99 wt. % of the first grain mode, based upon the total weight of the multimodal grain distribution.

In some embodiments, the first grain mode stabilized zirconia comprises at least 6 wt. % of matrix oxide stabilizer (e.g., at least partially stabilized), or sometimes at least 14 wt. % of matrix oxide stabilizer (e.g., fully stabilized by yttria), the matrix oxide stabilizer comprising at least one of an yttrium-containing compound, CaO, MgO, $Y_2O_3$, $CeO_2$, and mixtures thereof, based upon the weight of the first grain stabilized zirconia. Often, the matrix oxide stabilizer comprises an oxide-based compound and is thus named as an "oxide stabilizer," but as used herein the term "oxide stabilizer" shall be defined more broadly to also include non-oxide based compounds and elements, such as but not limited to non-oxide based yttrium-containing compounds, calcium, magnesium, cesium, and the like. However, the second grain mode preferably comprises at least 14 wt. % of at least one of an yttria-containing compound, CaO, MgO, $Y_2O_3$, $CeO_2$, and mixtures thereof, based upon the weight of the second grain mode.

In certain embodiments, the refractory material includes; (i) 20 to 50 wt. % of the first grain mode, based upon the total weight of the material; (ii) 1 to 80 wt. % of the second grain mode, based upon the total weight of the material; and (iii) a combined total of at least 1 wt. % of the preservative component within at least one of the first grain mode, the second grain mode, and the optional another grain mode.

In addition to a refractory material, the present inventions also include a stabilized ceramic refractory component that is suitable for use with a pyrolysis reactor, the component comprising; (i) at least 20 wt. % of a first grain mode based upon the total weight of the refractory component, the first grain mode including stabilized zirconia having a D50 grain size in the range of from 5 to 800 μm, the stabilized zirconia including a matrix oxide stabilizer to stabilize the first grain mode stabilized zirconia; (ii) at least 1 wt. % of a second grain mode having a D50 grain size in the range of from 0.01 μm up to not greater than one-fourth the D50 grain size of the first grain mode, dispersed within the first grain mode, based upon the total weight of the refractory component; and (iii) at least 1 wt. % of a preservative component dispersed within the aggregate of at least one of (a) the first grain mode stabilized zirconia, (b) the second grain mode, and (c) an optional another grain mode, based upon the total weight of the refractory component; wherein the component has porosity at 20° C. in the is range of from 5 to 45 vol %. In many embodiments the component comprises at least 10 wt. % of combined weight of the preservative component, the matrix oxide stabilizer, and optionally a second grain mode stabilizer, based upon the total weight of the component.

Often, the second grain mode consists of the preservative component. In other embodiments, the second grain mode consists essentially of the preservative component. The claimed limitation of a second grain mode and claimed limitations of a preservative component may in some embodiments be the same functional components, merely defined by two distinct sets of limitations. That is, in some embodiments, such as those that do not include a stabilized zirconia within the second grain mode, the second grain mode may include or be comprised of substantially exclusively the preservative component. Thereby, the at least 1 wt. % of second grain mode and the at least 1 wt. % of preservative component are substantially the same granular portions of the material, namely, the smaller or more fine granular material. The invention does not always require that the second grain mode be a physically distinct and additional material or element from the preservative component, though in many embodiments they will be two separate, physically distinct materials.

In many embodiments, component comprises a flexural strength of at least 6 kpsi and a normalized thermal shock resistance rating of at least four. The first grain mode stabilized zirconia comprises at least 1 wt. % of matrix oxide stabilizer, the matrix oxide stabilizer comprising at least one of an yttrium-containing compound, CaO, MgO, $Y_2O_3$, $CeO_2$, and mixtures thereof, based upon the weight of the first grain stabilized zirconia. The first grain mode stabilized zirconia preferably may comprise at least 6 wt. % of the matrix oxide stabilizer (e.g., at least partially stabilized). The preservative component comprises at least one of an yttrium-containing compound, CaO, MgO, $Y_2O_3$, $CeO_2$, and mixtures thereof.

In another aspect, the inventions include a method of preparing a ceramic composition comprising the steps of: a) preparing a granular ceramic composition or mixture including at least: (i) at least 20 wt. % of a first grain mode based upon the total weight of the ceramic composition, the first grain mode comprising stabilized zirconia having a D50 grain size in the range of from 5 to 800 μm, the stabilized zirconia including a matrix oxide stabilizer; and (ii) at least 1 wt. % of a second grain mode having a D50 grain size in the range of from 0.01 μm up to not greater than one-fourth the D50 grain size of the first grain mode based upon the total weight of the ceramic composition, (iii) at least 1 wt. % of a preservative component within the ceramic composition, based upon the total weight of the ceramic composition, the preservative component selected from at least one of an yttrium-containing compound, CaO, MgO, $Y_2O_3$, $CeO_2$, and mixtures thereof; b) combining the first is grain mode, the second grain mode, and the preservative component to form a dispersed composition; and c) sintering the dispersed composition at a temperature of at least 1500° C. for at least ten minutes to form a ceramic composition, wherein after sintering the ceramic composition has a porosity at ambient temperature in the range of from 5 to 45 vol %. The step b) of "combining" may further comprise the steps of: combining two of the preservative component, the first grain mode, and the second grain mode to form an initial composition; sintering the initial composition; grinding or otherwise reducing the initial composition to form a secondary composition; combining at least one of the preservative component, the first grain mode and the second grain mode with the secondary composition to form the dispersed composition.

In other embodiments, the inventive methods include the step of shaping at least a portion of at least one of the dispersed composition and the sintered ceramic composition. The step of shaping may include, but is not limited to, at least one of extruding, molding, forming, blowing, casting, pressing, drawing, rolling, milling, grinding, crushing, glazing, annealing, or combinations thereof. Forming or shaping may also include the step of controlling the shaping force and shaping processes such that the porosity at ambient temperature, after sintering is within a range of from 5 to 45 vol % based upon the volume of the component. This may mean using less force than would otherwise be done in forming such component from a traditional ceramic material. According to the present invention, the formed component is also sintering at a temperature of from 1500° C. to 1800° C. for at least ten minutes, but may be sintered for at least two hours at such temperature. The sintered, formed component may thus demonstrate performance properties that include a flexural strength of at least 6 kpsi and the normalized thermal shock resistance rating is at least four. The sintered components may also be further annealed or heated at a temperature of at least 1500° C. for at least two hours, wherein after such further heating the component has porosity at ambient temperature in the range of from 5 to 45 vol %, based upon the volume of the component. In many of such embodiments of methods, the second grain mode comprises the preservative component.

In still other variations, the present inventions include a thermal pyrolysis reactor for pyrolyzing a feedstock, the reactor including a refractory material comprising: (i) at least 20 wt. % of a first grain mode, the first grain mode including stabilized zirconia having a D50 grain size in the range of from 5 to 2000 μm based upon the total weight of the refractory material, the stabilized zirconia including a matrix oxide stabilizer; (ii) at least 1 wt. % of a second grain mode having a D50 grain size in the range of from 0.01 μm up to not greater than one-fourth the D50 grain size of the first grain mode zirconia, based upon the total weight of the refractory material; and (iii) at least 1 wt. % of a preservative component within the aggregate of at least one of (a) the first grain mode stabilized zirconia, (b) the second grain mode, and (c) an optional another grain mode, the preservative component comprising at least one of an yttrium-containing compound, CaO, MgO, $Y_2O_3$, $CeO_2$, and mixtures thereof; wherein after sintering, the material has porosity at 20° C. of from 5 to 45 vol %. In many embodiments, the second grain mode further comprises fully stabilized zirconia and the first grain stabilized zirconia comprises partially stabilized zirconia. In other embodiments, the first grain mode includes stabilized zirconia having a D50 grain size in the range of from 5 to 800 μm. In still other embodiments, the first grain mode stabilized zirconia is partially stabilized zirconia and is stabilized by at least 6 wt. % of at least one of an yttrium-containing compound, CaO, MgO, $Y_2O_3$, $CeO_2$, and mixtures thereof, based upon the weight of the first grain mode stabilized zirconia. In various other embodiments, the first grain mode stabilized zirconia is fully stabilized zirconia and is stabilized by at least 14 wt. % (~at least 8 mol %) of at least one of an yttrium-containing compound, CaO, MgO, $Y_2O_3$, $CeO_2$, and mixtures thereof, based upon the weight of the first grain stabilized zirconia.

According to still other embodiments of the inventive pyrolysis reactor, the refractory material comprises at least 10 wt. % of combined weight of the preservative component, the matrix oxide stabilizer, and optionally a second grain mode stabilizer, based upon the total weight of the material. In some embodiments, the second grain mode comprises a fully stabilized zirconia, the fully stabilized zirconia is stabilized by at least 14 wt. % of a second grain mode zirconia stabilizer based upon the weight of the second grain mode stabilized zirconia. In other aspects, the second grain mode comprises at least 15 wt. % of combined weight of second grain mode stabilizer and preservative component, based upon the weight of the second grain mode. Alternatively, the second grain mode consists essentially of the preservative component, while in still other embodiments, the second grain mode consists of the preservative component. According to other definitions, the invention also includes embodiments wherein the aggregate weight of the matrix oxide stabilizer, the preservative component, and an optional second grain mode stabilizer comprises at least 10 wt. % of the material, based upon the total weight of the material. Preferably, the reactor material comprises a flexural strength of at least 6 kpsi and a normalized thermal shock resistance rating of at least four, as defined herein. In some variations of the reactor, the first grain mode stabilized zirconia comprises at least 6 wt. % of matrix oxide stabilizer, the matrix oxide stabilizer comprising at least one of an yttrium-containing compound, CaO, MgO, $Y_2O_3$, $CeO_2$, and mixtures thereof, based upon the weight of the first grain stabilized zirconia. The preservative component comprises at least one of an yttrium-containing compound, CaO, MgO, $Y_2O_3$, $CeO_2$, and mixtures thereof.

The term "thermal pyrolysis reactor" is defined broadly to include substantially any high temperature apparatus capable of hosting thermal reactions therein at temperatures in excess of 1500° C. In some exemplary embodiments, the thermal pyrolysis reactor comprises at least one of a regenerative pyrolysis reactor and a deferred combustion pyrolysis reactor. In alternative embodiments, the inventive materials may be provided with substantially any of the many known reactors, crackers, refractory, and other thermal apparatus. In many apparatus, the inventive reactor material is heated to a temperature of at least 1500° C., but in other embodiments to temperatures in excess of 1600° C., 1700° C., 1800° C., and even in excess of 2000° C. The inventive materials are also useful at temperatures of less than 1500° C., but above such temperature is where the art has been in need of significant improvement. Exemplary reactor components may include, for example, but are not limited to a honeycomb monolith having flow channels for conducting at least one of a pyrolysis reactant, a pyrolysis feed, and a pyrolysis product through the monolith. Many components, such as those used in a reactor, may by design include flow channels that may be regarded as or referred to in some contexts as "void volume" through which fluid passes as part of the function of the component. It is understood that flow channels and other such designed void volume is not considered to be part of the porosity of the ceramic. The ceramic porosity specified herein is specifically for the portion of the component that does not carry flow; often referred to as the wall or the solid portion of the component.

A reactive region is merely those regions of the reactor apparatus that are exposed to the high temperatures and is not limited to direct contact with reaction components. The invention may include a step of heating the reactive region by in-situ thermal reaction. The reactive region may be defined broadly to include substantially any heated or heat-exposed portion of the reactor, such as the reactor core where the reactions occur. The reactive region may be heated by substantially any thermal process, but preferably may be heated by in-situ thermal reaction, such as deferred combustion. In other aspects, the inventive reactor components may include reactor regions or components that comprise the inventive components and materials described herein, that are also used quench the pyrolysis product to halt or interrupt the reaction kinetics.

In yet other aspects, the invention includes a process for the manufacture of a hydrocarbon product from a hydrocarbon feed using a pyrolysis reactor, the process is comprising the steps of: (a) providing a pyrolysis reactor with a reactive region comprising a refractory material comprising: (i) at least 20 wt. % of a first grain mode based upon the total weight of the refractory material, the first grain mode having a D50 grain size in the range of from 5 to 2000 μm, in some embodiments in the size range of from 5 to 800 μm, the stabilized zirconia including a matrix oxide stabilizer; (ii) at least 1 wt. % of a second grain mode having a D50 grain size in the range of from 0.01 μm up to not greater than one-fourth the D50 grain size of the first grain mode zirconia, based upon the total weight of the refractory material; and (iii) at least 1 wt. % of a preservative component within the aggregate of at least one of (a) the first grain mode stabilized zirconia, (b) the second grain mode stabilized zirconia, and (c) an optional another grain mode; wherein after sintering, the material has porosity at 20° C. in the range of from 5 to 45 vol %; (b) heating the reactive region component to a temperature of at least 1500° C. to create a heated region; and (c) feeding a hydrocarbon feed into the heated region to pyrolyze the hydrocarbon feed and create a pyrolyzed hydrocarbon product. The inventive process also includes the step of quenching the pyrolyzed hydrocarbon product to produce a quenched hydrocarbon pyrolysis product. The process may also include the step of heating the reactive region by in-situ thermal reaction. In some embodiments, the first grain mode includes stabilized zirconia having a D50 grain size in the range of from 5 to 800 μm.

In still other aspects the invention includes a process for forming a ceramic component, the process including the steps of: a) preparing a mixture comprising a multimodal ceramic grain distribution including; (i) at least 20 wt. % of first grain mode ceramic material, based upon the total weight of the multimodal grain distribution, including stabilized zirconia, the first grain mode comprising a D50 grain size in the range of from 5 to 2000 μm, in some embodiments 5 to 800 μm, the stabilized zirconia including a matrix oxide stabilizer to stabilize the first grain stabilized zirconia; and (ii) at least 1 wt. % of second grain mode ceramic material comprising a D50 grain size in the range of from 0.01 μm up to not greater than one-fourth the D50 grain size of the first grain mode, dispersed within the first grains, based upon the total weight of the multimodal grain distribution, the second grain mode comprising at least 1 wt. % of a preservative component based upon the weight of the second grain mode, to stabilize the first grain stabilized zirconia; (b) forming the mixture into a shape; (c) sintering the shape; wherein after sintering, the component has porosity at ambient temperature in the range of from 5 to 45 vol. %, based upon the volume of the component. The process may also include the step of forming the shape, which further comprises using a shaping force, including a limited shaping force so as not to over compact the grains, such as but not limited to molding, extruding, casting, drawing, compressing, cutting, milling, etc., to form the component shape.

EXAMPLE 1

Table 2 illustrates an exemplary multimodal ceramic mixture including a coarse grit mode of stabilized zirconia and second grit mode comprised of yttria as a preservative component, resulting in a composite mixture having a bimodal grain distribution. The coarse grit mode (H.C. Starck's Amperit® 827.054) is agglomerated and sintered powder produced by spray-drying a suspension comprising fine powders, yttrium oxide stabilizer, and organic binder and subsequent sintering. The resulting composition for the coarse grit mode is a partially stabilized zirconia. The second grit mode consists essentially of a stabilizer oxide material, in this example yttrium oxide. The composition may also include lesser percentages of various secondary oxide materials, such as may be present by virtue of manufacturing process additives or products, mere incidental presence, and/or as contaminants. The second grit mode yttrium oxide functions both as the second grit mode structural component in the prepared multimodal ceramic composition and also as a preservative component as it includes oxide material (stabilizer) that is not initially actively involved in directly stabilizing any zirconia crystal materials that are present. It has been learned that the presence of the stabilizer within the second grit mode can act over an extended period of time to increase the activity of the stabilizer within the partially stabilized coarse grit mode to sustain the partially stabilized crystal structure of the coarse grit mode.

TABLE 2

| Company | Grade | Chemistry (wt. %) | Size |
|---|---|---|---|
| H.C. Starck | Amperit® 827.054 | 87.6~89.6% $ZrO_2$: Balance, $Y_2O_3$: 7.0~9.0%, $HfO_2$: 2.0%, $Al_2O_3$: 0.2%, $Fe_2O_3$: 0.3%, $SiO_2$: 0.5%, $TiO_2$: 0.4% | 21~65 μm (D50 = 30 μm) (Spherical Particle) |
| Alfa Aesar | Stock No. 44286 | 99.9% $Y_2O_3$ | 1.0 μm (Crystallite Size) |

Both the coarse and second grain modes comprise a ceramic stabilizer, but the second grain mode either comprises substantially (a) only a preservative component stabilizer such as a metal oxide or a pure elemental form, or (b) includes a stabilized ceramic as either (i) having a surplus of stabilizer above the amount required to stabilize the second grit ceramic, the surplus as the preservative component or (ii) includes a preservative component stabilizer as a component of the second grit mode that is separate from and in addition to the stabilized ceramic within the second grit mode. In Example 1, zirconia ceramic is not present in the second grain mode. In some embodiments, however, there may be grain modes present in the mixture that may or may not include zirconia or ceramics within such other modes.

Thus, 88.2 wt. % coarse grit mode of stabilized zirconia powder and 11.8 wt. % second grit mode of substantially pure yttrium powder were mixed with an organic binder for an extrusion process. (During sintering, the pure yttrium oxidizes into yttrium oxide or yttria.) Note that the 7.0 to 9.0 wt. % $Y_2O_3$ only partially stabilizes the $ZrO_2$ in the coarse grit mode, thus providing a relatively strong and thermal shock resistant coarse grit matrix. The mixed powder was extruded to fabricate a green body of about 1.13 mm in thickness, 7.9 mm in width, and 100 mm in length. The extruded green body was fired at 1500° C. for two hrs in an industrial kiln to fabricate a sintered body.

Referring to FIG. 1, FIG. 1a illustrates an SEM image of the sintered body processed according to this example, wherein the legend bar represents 50 μm. In this image, spherical coarse grit mode of stabilized zirconia have a D50 grain size of about 30 μm and the second grit mode crystals of substantially just yttria that are in the D50 grain size of about 1.0 μm. The fine yttria grits are beneficially located at the neck between adjacent coarse grits and provide the desirable increase in density and enhanced bonding between coarse grits, while still affording the requisite porosity range. In this image, porosity appears dark and is desirably located at interspaces created between coarse stabilized zirconia grits. The resultant sintered body comprised:

i) composite ceramic matrix comprising a bimodal grain distribution including 88.2 wt. % coarse grit stabilized zirconia with a D50 average grit size of about 30 μm; and 11.8 wt. % fine yttria with a D50 average grit size of about 1.0 μm.
ii) 23 vol % porosity
iii) Normalized thermal shock resistance=5.
iv) MOR flexural strength=6.4 kpsi To ascertain the thermal stability of the zirconia ceramic composition of this invention, the sintered body (1500° C., 2 hrs) was further annealed at 1800° C. for 100 hrs in a hydrogen atmosphere flowing at a rate of 50 cc/min. A high temperature, high vacuum furnace was used for this experiment. The 100 hrs of total exposure at 1800° C. was segmented into five heat cycles of 20 hrs each with cooling to ambient temperature between each cycle. In each cycle, the sintered component was heated to 1800° C. at a heating rate of 15° C./min, held at 1800° C. for 20 hrs, and then cooled to 50° C. at a cooling rate of 15° C./min. Five total cycles were employed to simulate rapid start up and shut down processes and to is investigate the resulting effect on thermal shock.

FIG. 2b provides an SEM image of the fractured cross section of the annealed body after heating at 1800° C. for 100 hrs in a hydrogen atmosphere, wherein the legend bar represents 100 μm. In this image, the first mode grits of partially stabilized zirconia are in the D50 average grain size of about 50.0 μm, but the fine mode grits of yttria become yttria-rich stabilized zirconia and incorporate into the annealed matrix to provide an enhanced-strength bond between first mode grains. Porosity appears dark and uniformly distributed in the annealed body. The measured porosity of the sintered and annealed body is about 13 vol %. The measured properties of the annealed embodiment comprised:

i) 87 wt. % advanced dual oxide composite matrix
ii) 13 vol % porosity.
iii) Normalized thermal shock resistance rating is 5.
iv) MOR Flexural Strength is 7.1 kpsi The resultant D50 grit size and porosity in the annealed body provide mechanical strength and thermal shock resistance properties that are within the desired range for such properties. The annealed, yttria-rich, stabilized multimodal ceramic component resulted at least in part from the first modes' crystallization, the porosity, and multimodal composition. The yttria in the second grit mode maintains the enhanced strength and shock resistance properties while simultaneously providing improved chemical stability at high temperature.

EXAMPLE 2

A ceramic composition was prepared comprising 80 wt. % coarse grit mode (–149 μm particle size) of partially stabilized zirconia powder (including 4 wt. % CaO stabilizer, from Alfa Aesar) and 20 wt. % second grit mode (–10 μm particle size) of CaO powder (99.95 wt. %, from Alfa Aesar) were dispersed with heptane in HDPE milling jar. The powders in heptane were mixed for 4 hours with Yttria Toughened Zirconia (YTZ) balls (10 mm diameter, from Tosoh Ceramics) in a ball mill at 100 rpm. The heptane was removed from the mixed powders by a RotoVap™ evaporator. The dried powder was compacted in a 40 mm diameter die in a hydraulic uniaxial press (SPEX 3630 Automated X-press) at 5,000 psi. The resulting green disc pellet was ramped up to 600° C. at 25° C./min in air and held at 600° C. for 30 min for residual solvent removal. The disc was then heated to 1600° C. in air and held at 1600° C. for 4 hours of sintering and annealing. The temperature was then reduced to below 100° C. at –15° C./min. The resultant dual oxide composites comprised:
  i) 67 wt. % coarse partially stabilized zirconia with D50 grain size of about 80 μm.
  ii) 16 wt. % fine CaO-rich oxide with D50 average grain size of about 20 μm.
  iii) 17 vol % porosity.
  iv) Normalized thermal shock resistance=5.
  v) MOR flexural strength=6.0 kpsi

EXAMPLE 3

A ceramic composition was prepared including 40 wt. % of coarse grit (–105+44 μm particle size range) of stabilized zirconia powder (including 10~15% $Y_2O_3$ stabilizer, from Alfa Aesar), 40 wt. % of coarse grit (–44 μm particle size range) of stabilized zirconia powder (containing 10~15% $Y_2O_3$ stabilizer, from Alfa Aesar), and 20 wt. % of second grit (1 μm average particle size) of $Y_2O_3$ powder (99.9%, from Alfa Aesar) were dispersed with heptane in HDPE milling jar. The powders were mixed in heptane for 4 hours with zirconia balls (10 mm diameter, from Tosoh Ceramics) in a ball mill at 100 rpm. The heptane was removed from the mixed powders by rotary evaporator. The dried powder was compacted in a 40 mm diameter die in a hydraulic uniaxial press (SPEX 3630 Automated X-press) at 5,000 psi. The resulting green disc pellet was ramped up to 600° C. at 25° C./min in air and held at 600° C. for 30 min for residual solvent removal. The disc was then heated to 1600° C. in air and held at 1600° C. for 4 hours for sintering. The temperature was then reduced to below 100° C. at minus 5° C./min. The resultant composites comprised:
  i) 67 wt. % partially stabilized zirconia with a P50 grain size of about 50 μm.
  ii) 16 wt. % fine $Y_2O_3$-rich oxide with average grain size of about 2 μm.
  iii) 17 vol % porosity.
  iv) Normalized thermal shock resistance=5.
  v) MOR flexural strength=6.0 kpsi

EXAMPLE 4

About 143.0 grams of yttrium nitrate hexahydrate, $Y(NO_3)_3 \cdot 6H_2O$, were dissolved in about 200 cc of ethanol. After a clear solution was prepared, about 125.0 grams of coarse grit mode (–105+44 μm particle size range) stabilized zirconia powder (containing 10~15% $Y_2O_3$, from Alfa Aesar) was added to the solution. The suspension was mixed for about 10 hrs without milling media in a ball mill at 100 rpm. The ethanol was removed from the solution by heating on a hot plate. The dried powder was ramped up to 900° C. at 25° C./min in air and held at 900° C. for 2 hrs to decompose yttrium nitrate to yttria. The heat treated powder was ground by use of mortar and pestle. And the powder was compacted in a 40 mm diameter die in a hydraulic uniaxial press (SPEX 3630 Automated X-press) at 5,000 psi. The is resulting green disc pellet was then heated to 1600° C. in air and held at 1600° C. for 4 hours. The temperature was then reduced to below 100° C. at –15° C./min. The resultant advanced dual oxide composites comprised:
  i) 58 wt. % coarse PSZ with average grain size of about 60 μm.
  ii) 32 wt. % fine $Y_2O_3$-rich oxide with average grain size of about 3 μm.
  iii) 10 vol % porosity.
  iv) Normalized thermal shock resistance=5.
  v) MOR flexural strength=8.5 kpsi

EXAMPLE 5

Two commercially available, refractory grade monomodal zirconias (MgO-PSZ ("PSZ"=partially stabilized Zirconia) and CaO-PSZ) were compared to the exemplary composite of previous Example 4. First comparative composition included Zircoa's 3077 ceramic, which is a MgO partially stabilized zirconia (2.6 wt. % MgO), and is a monomodal, first mode grain size sintered composition having density of about 4.9 g/cc and porosity of about 14%. It contains about 62 wt. % monoclinic phase zirconia crystals. In addition to MgO, it also contains some chemical impurities or secondary oxides, including about 1.2 wt. % $SiO_2$, 0.1 wt. % $Al_2O_3$, 0.1 wt. % CaO, 0.4 wt. % $Fe_2O_3$ and 0.2 wt. % $TiO_2$. The second comparative composition included Zircoa's 1661 ceramic, which is a CaO partially stabilized zirconia (3.0 wt. % CaO), and is a monomodal, first mode grain size sintered composition having density of about 4.1 g/cc and porosity of about 27 vol %. It contains about 24 wt. % monoclinic phase zirconia crystals. In addition to CaO, it also contains some chemical impurities or secondary oxides, including about 2.1 wt. % $Al_2O_3$, 0.4 wt. % $SiO_2$, 0.3 wt. % MgO, 0.1 wt. % $Fe_2O_3$ and 0.1 wt. % $TiO_2$. Each prepared comparative composition and the exemplary composition of Example 6 was exposed to a flowing hydrogen environment at 1700° C. using a high temperature/high vacuum furnace. After completion of three heat cycles of 24 hours per cycle, the chemical stability of each sample was determined by weight loss measurement of the specimen. As reflected in Table 3 below, the comparative MgO-PSZ had the highest weight loss (0.024 g/cm²), followed by the comparative CaO stabilized (0.008 g/cm²). However, the exemplary $Y_2O_3$ stabilized sample according to Example 4 only reflected weight loss of (0.001 g/cm²), demonstrating the highest rate of retention of stabilizer. The significant weight loss of two comparative zirconia materials was derived from loss of the stabilizer. For instance, after the comparative MgO-PSZ was exposed to a flowing hydrogen environment at 1700° C. in a high temperature/high vacuum furnace, the is furnace chamber was filled up with ultra fine needle-like particles. Scanning electron microscopy and energy dispersive X-ray analysis confirmed that these particles were pure MgO. The exemplary sample also demonstrated the highest retained flexural strength after completion of the test. Both comparative samples also demonstrated MOR flexural strength of less than the desirable minimum of 6.0 kpsi after exposure to the heat cycles.

TABLE 3

| Ceramics | Manufacturer/ Trade Name | Normalized Thermal Shock Resistance | Flexural Strength (kpsi) | Weight Loss (g/cm$^2$) |
| --- | --- | --- | --- | --- |
| MgO-PSZ | Zircoa/Comp.3077 (comparative) | 5 | 5.0 | 0.024 |
| CaO-PSZ | Zircoa/Comp.1661 (comparative) | 5 | 4.8 | 0.008 |
| Example 4 | Exemplary dual oxide composite | 5 | 8.5 | 0.001 |

EXAMPLE 6

An exemplary ceramic composition was prepared by mixing 60 wt. % of coarse grit of stabilized zirconia powder (H.C. Starck's Amperit® 827.054 of Example 1), D50 30 μm, 30 wt. % of medium grit (4 μm D50 particle size) of stabilized zirconia powder (TZ8Y, from Tosoh Co.), and 10 wt. % of second grit (1 μm D50 particle size) of $Y_2O_3$ powder (99.9%, from Alfa Aesar). The mixed ceramic powder was further compounded into an extrusion batch comprising an organic binder and a solvent. The batch was then extruded into a green honeycomb body, dried and fired at about 1650° C. to form a honeycomb monolith ceramic body. The resultant dual oxide composites comprised:
  i) 60 wt. % partially stabilized zirconia with a D50 grain size of 50 μm.
  ii) 32 wt. % fine $Y_2O_3$-rich oxide with a D50 grain size of 2 μm.
  iii) 8 vol % porosity.
  iv) Normalized thermal shock resistance=4.
  v) MOR flexural strength=9.5 kpsi

EXAMPLE 7

Another exemplary ceramic composition was prepared by mixing 70 wt. % of 30 μm D50 coarse grit of partially stabilized zirconia powder (Zircoa 1373 powder, including 8 wt. % $Y_2O_3$ stabilizer, from Zircoa Inc.) and 30 wt. % of second grit (1 μm average particle size) of $Y_2O_3$ powder (99.9%, from Alfa Aesar). Additional 2 wt. % wax over the ceramic mix was also added to provide green strength. The mixed ceramic batch was pressed into a circular shape (10 cm diameter×3 cm height) and fired at 1600° C. for sintering. The resultant composites comprised:
  i) 65 wt. % partially stabilized zirconia with a P50 grain size of about 50 μm.
  ii) 20 wt. % fine $Y_2O_3$-rich oxide with average grain size of about 2 μm.
  iii) 15 vol % porosity.
  iv) Normalized thermal shock resistance=5.
  v) MOR flexural strength=7.5 kpsi

EXAMPLE 8

500.0 grams of yttrium nitrate hexahydrate, $Y(NO_3)_3 \cdot 6H_2O$, were dissolved in 200 cc of deionized water to prepare a clear solution. A circular zirconia body made out of Zircoa 2290 (including 5 wt. % $Y_2O_3$ stabilizer, from Zircoa Inc., refractory brick comprising fused and sintered grains of yttria stabilized zirconia) was dipped into the solution, dried and sintered at 1600° C. for 4 hrs in air. Dipping and sintering process was repeated for 7 times until the circular zirconia body gained about 30 wt. % in mass. After the final dipping and sintering, the resultant dual oxide composites comprised:
  i) 60 wt. % coarse grit with a D50 grain size of about 100 μm.
  ii) 25 wt. % fine $Y_2O_3$-rich oxide second grit with D50 grain size of about 5 μm.
  iii) 15 vol % porosity.
  iv) Normalized thermal shock resistance=5.
  v) MOR flexural strength=6.7 kpsi While the present invention has been described and illustrated with respect to certain embodiments, it is to be understood that the invention is not limited to the particulars disclosed and extends to all equivalents within the scope of the claims. Unless otherwise stated, all percentages, parts, ratios, etc. are by weight. Unless otherwise stated, a reference to a compound or component includes the compound or component by itself as well as in combination with other elements, compounds, or components, such as mixtures of compounds. Further, when an amount, concentration, or other value or parameter is given as a list of upper preferable values and lower preferable values, this is to be understood as specifically disclosing all ranges formed from any pair of an upper preferred value and a lower preferred value, regardless of whether ranges are separately disclosed.

What is claimed is:

1. A method of preparing a ceramic composition comprising the steps of:
   a) preparing a granular ceramic composition including at least:
     (i) at least 20 wt. % of a first grain mode based upon the total weight of said ceramic composition, said first grain mode comprising stabilized zirconia having a D50 grain size in the range of from 5 to 2000 μm, said stabilized zirconia including a matrix oxide stabilizer; and
     (ii) at least 1 wt. % of a second grain mode having a D50 grain size in the range of from 0.01 μm up to not greater than one-fourth the D50 grain size of said first grain mode based upon the total weight of said ceramic composition,
     (iii) at least 1 wt. % of a preservative component within the ceramic composition, based upon the total weight of said ceramic composition, said preservative component selected from at least one of an yttrium-containing compound, CaO, MgO, $Y_2O_3$, $CeO_2$, and mixtures thereof;
   b) combining said first grain mode, said second grain mode, and said preservative component to form a dispersed composition; and
   c) sintering said dispersed composition at a temperature of at least 1500° C. for at least ten minutes to form a ceramic composition, wherein (i) after sintering said ceramic composition has a porosity at ambient temperature in the range of from 5 to 45 vol % and (ii) the grains of the second grain mode consist essentially of yttria.

2. The method of claim 1, wherein said step of combining further comprising the steps of:
   combining two of said preservative component, said first grain mode, and said second grain mode to form an initial composition;
   sintering said initial composition;
   grinding or otherwise reducing said initial composition to form a secondary composition;
   combining at least one of said preservative component, said first grain mode and said second grain mode with said secondary composition to form said dispersed composition.

3. The method of claim 1, further comprising the step of shaping at least a portion of at least one of said dispersed composition and said sintered ceramic composition.

4. The method of claim 3, wherein the step of shaping comprises at least one of extruding, molding, forming, blowing, casting, pressing, drawing, rolling, milling, grinding, crushing, glazing, annealing, or combinations thereof.

5. A thermal pyrolysis reactor for pyrolyzing a feedstock, said reactor including a refractory material comprising:
 (i) at least 20 wt. % of a first grain mode stabilized zirconia, said first grain mode having a D50 grain size in the range of from 5 to 2000 µm based upon the total weight of said refractory material, said stabilized zirconia including a matrix oxide stabilizer;
 (ii) at least 1 wt. % of a second grain mode having a D50 grain size in the range of from 0.01 µm up to not greater than one-fourth the D50 grain size of said first grain mode zirconia, based upon the total weight of said refractory material; and
 (iii) at least 1 wt. % of a preservative component within the aggregate of at least one of (a) said first grain mode stabilized zirconia, (b) said second grain mode, and (c) an optional another grain mode, said preservative component comprising at least one of an yttrium-containing compound, CaO, MgO, $Y_2O_3$, $CeO_2$, and mixtures thereof;
 wherein after sintering, said material has porosity at 20° C. of from 5 to 45 vol %.

6. The reactor of claim 5, wherein said second grain mode further comprises fully stabilized zirconia and said first grain stabilized zirconia comprises partially stabilized zirconia.

7. The reactor of claim 5, wherein said first grain mode stabilized zirconia is partially stabilized zirconia and is stabilized by at least 6 wt. % of at least one of an yttrium-containing compound, CaO, MgO, $Y_2O_3$, $CeO_2$, and mixtures thereof, based upon the weight of said first grain mode stabilized zirconia.

8. The reactor of claim 5, wherein said first grain mode stabilized zirconia is fully stabilized zirconia and is stabilized by at least 14 wt. % of at least one of an yttrium-containing compound, CaO, MgO, $Y_2O_3$, $CeO_2$, and mixtures thereof, based upon the weight of said first grain stabilized zirconia.

9. The reactor of claim 5, wherein said refractory material comprises at least 10 wt. % of combined weight of said preservative component, said matrix oxide stabilizer, and optionally a second grain mode stabilizer, based upon the total weight of said material.

10. The reactor of claim 5, wherein said second grain mode comprises a fully stabilized zirconia, said fully stabilized zirconia is stabilized by at least 14 wt. % of a second grain mode zirconia stabilizer based upon the weight of said second grain mode stabilized zirconia.

11. The reactor of claim 5, wherein said second grain mode comprises a fully stabilized zirconia and at least 1 wt. % of preservative component, based upon the total weight of said second grain mode.

12. The thermal reactor of claim 5, wherein said second grain mode comprises at least 15 wt. % of combined weight of second grain mode stabilizer and preservative component, based upon the weight of said second grain mode.

13. The thermal reactor of claim 5, wherein said second grain mode consists essentially of said preservative component.

14. The thermal reactor of claim 13, wherein the aggregate weight of said matrix oxide stabilizer, said preservative component, and an optional second grain mode stabilizer comprises at least 10 wt. % of said material, based upon the total weight of said material.

15. The thermal reactor of claim 5, wherein said material comprises a flexural strength of at least 6 kpsi and a normalized thermal shock resistance rating of at least four.

16. The thermal reactor of claim 5, wherein said first grain mode comprises stabilized zirconia having a D50 grain size in the range of from 5 to 800 µm.

17. The thermal reactor of claim 5, wherein said first grain mode stabilized zirconia comprises at least 6 wt. % of matrix oxide stabilizer, said matrix oxide stabilizer comprising at least one of an yttrium-containing compound, CaO, MgO, $Y_2O_3$, $CeO_2$, and mixtures thereof, based upon the weight of said first grain stabilized zirconia.

18. The thermal reactor of claim 5, wherein said thermal pyrolysis reactor comprises at least one of a regenerative pyrolysis reactor and a deferred combustion pyrolysis reactor.

19. The thermal reactor of claim 5, wherein said reactor material is heated to a temperature of at least 1500° C.

20. The thermal reactor of claim 5, wherein said material comprises a honeycomb monolith having flow channels for conducting at least one of a pyrolysis reactant, a pyrolysis feed, and a pyrolysis product through said monolith.

21. The thermal reactor of claim 5, wherein said material comprises at least one of spheres, beads, honeycomb materials, tubes, pipes, U-tubes, fluid mixers, nozzles, extruded monoliths, bricks, tiles, catalyst trays, reactor trays, tray components, and other refractory components that are exposed to high temperature.

22. A process for the manufacture of a hydrocarbon product from a hydrocarbon feed using a pyrolysis reactor, the process comprising the steps of:
 (a) providing a pyrolysis reactor with a reactive region comprising a refractory material, said refractory material comprising:
  (i) at least 20 wt. % of a first grain mode, said first grain mode comprising stabilized zirconia having a D50 grain size in the range of from 5 to 2000 µm based upon the total weight of said refractory material, said stabilized zirconia including a matrix oxide stabilizer;
  (ii) at least 1 wt. % of a second grain mode having a D50 grain size in the range of from 0.01 µm up to not greater than one-fourth the D50 grain size of said first grain mode zirconia, based upon the total weight of said refractory material; and
  (iii) at least 1 wt. % of a preservative component within the aggregate of at least one of (a) said first grain mode, (b) said second grain mode, and (c) an optional another grain mode;
  wherein after sintering, said material has porosity at 20° C. in the range of from 5 to 45 vol %;
 (b) heating said reactive region to a temperature of at least 1500° C. to create a heated region; and
 (c) feeding a hydrocarbon feed into said heated region to pyrolyze said hydrocarbon feed and create a pyrolyzed hydrocarbon product.

23. The process of claim 22, further comprising the step of quenching said pyrolyzed hydrocarbon product to produce a quenched hydrocarbon pyrolysis product.

24. The process of claim 22, further comprising the step of heating said heated region by in-situ thermal reaction.

* * * * *